(12) United States Patent
Wu et al.

(10) Patent No.: US 10,277,372 B2
(45) Date of Patent: Apr. 30, 2019

(54) METHOD, DEVICE AND SYSTEM FOR TRANSMITTING ENHANCED DOWNLINK CONTROL CHANNEL

(71) Applicant: HUAWEI TECHNOLOGIES CO., LTD., Shenzhen, Guangdong (CN)

(72) Inventors: Qiang Wu, Beijing (CN); Yiqun Qian, Shenzhen (CN); Yang Li, Beijing (CN); Jianghua Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 175 days.

(21) Appl. No.: 14/182,558

(22) Filed: Feb. 18, 2014

(65) Prior Publication Data
US 2014/0233474 A1  Aug. 21, 2014

Related U.S. Application Data

(63) Continuation of application No. PCT/CN2012/080355, filed on Aug. 20, 2012.

(30) Foreign Application Priority Data

Aug. 18, 2011 (CN) .......................... 2011 1 0237806
Mar. 22, 2012 (CN) .......................... 2012 1 0079003

(51) Int. Cl.
*H04L 5/00* (2006.01)
*H04W 72/04* (2009.01)

(52) U.S. Cl.
CPC .......... *H04L 5/0048* (2013.01); *H04L 5/0016* (2013.01); *H04L 5/0023* (2013.01);
(Continued)

(58) Field of Classification Search
CPC ....... H04L 5/003; H04L 5/0026; H04L 5/001; H04L 5/0053; H04L 5/0023;
(Continued)

(56) References Cited

U.S. PATENT DOCUMENTS

2011/0170496 A1* 7/2011 Fong ..................... H04L 5/0053
                                                                   370/329
2011/0249633 A1* 10/2011 Hong .................... H04L 5/0053
                                                                   370/329
(Continued)

FOREIGN PATENT DOCUMENTS

CN  102082600 A  6/2011
CN  102420685 A  4/2012
(Continued)

OTHER PUBLICATIONS

Japanese Office Action dated Feb. 3, 2015 in Japanese Application No. 2014-525300.
(Continued)

*Primary Examiner* — Kwang B Yao
*Assistant Examiner* — Syed M Bokhari
(74) *Attorney, Agent, or Firm* — Staas & Halsey LLP

(57) ABSTRACT

The present invention discloses a method, a device and a system for transmitting an enhanced downlink control channel, which belong to the communications field. The method for sending an enhanced downlink control channel includes: presetting a multiplexing unit, where the multiplexing unit includes at least one resource block pair, and the at least one resource block pair includes E-PDCCH resources and DM RS resources, and the E-PDCCH resources include multiple control channel elements; sending at least one E-PDCCH corresponding to at least one UE in at least one control channel element of the multiplexing unit, and sending the DM RS corresponding to the at least one UE. The present invention reduces the granularity of an enhanced downlink control channel, saves resources and enhances the downlink control channel, thereby providing more control channels for the UE to use.

28 Claims, 10 Drawing Sheets

(52) U.S. Cl.
CPC .......... *H04L 5/0026* (2013.01); *H04L 5/0053* (2013.01); *H04W 72/042* (2013.01)

(58) Field of Classification Search
CPC .. H04L 5/0016; H04L 5/0048; H04W 72/042; H04W 72/04
USPC .......................................................... 370/329
See application file for complete search history.

(56) References Cited

U.S. PATENT DOCUMENTS

| | | | | |
|---|---|---|---|---|
| 2012/0099544 | A1* | 4/2012 | Pajukoski | H04L 5/0032 370/329 |
| 2012/0275400 | A1* | 11/2012 | Chen | H04J 11/0033 370/329 |
| 2013/0039284 | A1* | 2/2013 | Marinier | H04L 5/001 370/329 |
| 2013/0044692 | A1* | 2/2013 | Nory | H04L 5/0048 370/329 |
| 2014/0119317 | A1 | 5/2014 | Kim et al. | |
| 2014/0348109 | A1* | 11/2014 | Chen | H04L 5/0023 370/329 |

FOREIGN PATENT DOCUMENTS

| | | |
|---|---|---|
| CN | 102612094 A | 7/2012 |
| JP | 2010-245641 | 10/2010 |
| RU | 2233543 | 7/2004 |
| WO | 2011/066793 A1 | 6/2011 |
| WO | WO 2011/085195 A1 | 7/2011 |
| WO | WO 2012/109542 A1 | 8/2012 |
| WO | 2013/002528 A2 | 1/2013 |

OTHER PUBLICATIONS

ETRI, "Discussions on enhanced PDCCH structure", 3GPP TSG RAN WG1 Meeting #66, Athens, Greece, Aug. 22-26, 2011, pp. 1-4.
LG Electronics, "Clarification of PRB Bundling in Un Link", 3GPP TSG RAN WG1 Meeting #63bis, Dublin, Ireland, Jan. 17-21, 2011, pp. 1-3.
Russian Notice of Allowance dated Apr. 3, 2015 in corresponding Russian Patent Application No. 2014110179/07(016032).
European Office Action dated May 4, 2015 in corresponding European Patent Application No. 12823933.2.
LG Electronics, "Remaining Details on PRB bundling", 3GPP TSG RAN WG1 Meeting #62, Madrid, Spain, Aug. 2010, 3 pp.
International Search Report, dated Nov. 29, 2012, in corresponding International Application No. PCT/CN2012/080355 (4 pp.).
Extended European Search Report dated Jul. 3, 2014 in corresponding European Patent Application No. 12 82 3933.
Samsung: "Discussion on ePDCCH Design Issues", 3GPP DRAFT; R1-112517 EPDCCH, 3$^{rd}$ Generation Partnership Project (3GPP), Mobile Competence Centre; 650, Route Ds Lucioles; F-06921 Sophia-Antipolis Cedex; France, vol. RAN WG1, No. Athens, Greece; Aug. 22, 2011, Aug. 16, 2011 (Aug. 16, 2011), XP050537597.
Nokia et al: "On enhance downlink control signaling for Rel-11", 3GPP DRAFT; R1-111743, 3$^{rd}$ Generation Partnership Project (3GPP), Mobile Compentece Centre; 650 Route Des Lucioles; F-06921 Sophia-Antipolis Cedex; France, vol. RAN WG1, No. Barcelona, Spain; May 9, 2011, May 3, 2011 (May 3, 2011), XP050491341.
R1-114302, "DM-RS Design for E-PDCCH in Rel-11", document of 3GPP TSG RAN WG1 Meeting #67, Nov. 14-18, 2011, pp. 1-3, Agenda Item 7.7.1, NTT DOCOMO, San Francisco, U.S.A.
"3$^{rd}$ Generation Partnership Project; Technical Specification Group Radio Access Network; Evolved Universal Terrestrial Radio Access (E-UTRA); Physical layer procedures (Release 10)", 3GPP TS 36.213 V10.2.0 (Jun. 2011) *Technical Specification*, 2011, pp. 1-120, 3GPP Organizational Partners, Valbonne, France.
International Search Report dated Nov. 29, 2012, in corresponding International Patent Application No. PCT/CN2012/080355.
Japanese Notice of Allowance dated Mar. 15, 2016 in corresponding Japanese Patent Application No. 2014-525300.
"Layer-to-DM RS port mapping for LTE-Advanced", 3GPP TSG-RAN WG1 #59bis, R1-100050, Jan. 18-22, 2010, Valencia, Spain, 5 pages.
Korean Office Action dated Jul. 5, 2016 in corresponding Korean Patent Application No. 10-2015-7032424.
Extended European Search Report dated Nov. 4, 2016 in corresponding European Patent Application No. 16163507.3.
Intel Corporation, "On Downlink Control Signaling Enhancement", 3GPP TSG RAN WG1 Meeting #66, R1-112219, Athens, Greece, Aug. 22-26, 2011, pp. 1-4.
Japanese Office Action dated Jun. 6, 2017 in corresponding Japanese Patent Application No. 2016-097154.
Ericsson, ST Ericsson, "On Downlink control signaling enhancements," 3GPP TSG-RAN WG1 #66, Aug. 22-26, 2011, R1-112292, 2 pages.
Huawei, HiSilicon, "Investigation on downlink DMRS enhancements," 3GPP TSG RAN WG1 Meeting #65, May 9-13, 2011, R1-111255, 7 pages.

\* cited by examiner

METHOD, DEVICE AND SYSTEM FOR TRANSMITTING ENHANCED DOWNLINK CONTROL CHANNEL

CROSS-REFERENCE TO RELATED APPLICATION

This application is a continuation of International Application No. PCT/CN2012/080355, filed on Aug. 20, 2012, which claims priority to Chinese Patent Application No. 201110237806.9, filed on Aug. 18, 2011 and Chinese Patent Application No. 201210079003.X, filed on Mar. 22, 2012, all of which are hereby incorporated by reference in their entireties.

TECHNICAL FIELD

The present invention relates to the communications field, and in particular, to a method, a device and a system for transmitting an enhanced downlink control channel.

BACKGROUND

In a 3GPP ($3^{rd}$ Generation Partnership Project, $3^{rd}$ generation partnership project) LTE (Long Term Evolution, long term evolution)/LTE-A (LTE-advanced, LTE-advanced) system, an OFDMA (Orthogonal Frequency Division Multiple Access, orthogonal frequency division multiple access) manner is usually adopted for a downlink multiple access manner. Downlink resources of a system are divided into OFDM (Orthogonal Frequency Division Multiple, orthogonal frequency division multiple) symbols in terms of time, and divided into subcarriers in terms of frequency.

According to the LTE Release 8/9/10 standard, a normal downlink subframe includes two slots (slot), each slot includes 7 OFDM symbols, a normal downlink subframe includes 14 or 12 OFDM symbols in total, and the size of an RB (Resource Block, resource block) is defined: an RB includes 12 subcarriers in a frequency domain and is half of a subframe duration (one slot) in a time domain, that is, it includes 7 or 6 OFDM symbols, where the length symbol of a normal CP (Cyclic Prefix, Cyclic Prefix) is 7 OFDM symbols and the length symbol of an extended cyclic prefix is 6 OFDM symbols. A subcarrier in an OFDM symbol is referred to as an RE (Resource Element, resource element), so an RB includes 84 or 72 REs. In a subframe, a pair of RBs of two slots is referred to as a resource block pair, namely, an RB pair (RB pair).

For various data carried on a subframe, mappings are organized by dividing physical time-frequency resources of the subframe into various physical channels. The various physical channels generally involve two types: a control channel and a service channel. Correspondingly, data carried by a control channel may be referred to as control data (or control information), whereas data carried by a service channel may be referred to as service data. The fundamental objective of communications is to transmit service data, and the function of a control channel is to aid the transmission of service data, so in the design of a communication system, resources occupied by a control channel should be minimized.

Generally, resources used for transmitting service data in an OFDMA system are allocated flexibly, that is, to a UE (User Equipment, user equipment), the number of RBs occupied by the service data sent to the UE by each subframe, and the initial positions of the RBs in all RBs in the entire system are changeable. Therefore, when service data is sent to the UE, the UE needs to be notified at which RBs the UE should receive the service data sent to the UE. Similarly, for a UE, a modulation and coding scheme adopted by each subframe to send the service data to the UE is also changeable, and also needs to be notified to the UE. Information such as RA (Resource Allocation, resource allocation) and MCS (Modulation and Coding Scheme, modulation and coding scheme) is to aid or control the transmission of service data, so it is referred to as control information and is transmitted on a control channel.

According to the LTE Release 8/9/10 standard, a control channel in a subframe may occupy the front 3 OFDM symbols of all RBs in the entire system. By taking a PDCCH (Physical Downlink Control CHannel, physical downlink control channel) carrying control information such as scheduling as an example, a complete PDCCH is formed by one or more CCEs (Control Channel Element, control channel element), a CCE is formed by 9 REGs (Resource Element Group, resource element group) and an REG occupies 4 REs. According to the LTE Release 8/9/10, a PDCCH may be formed by 1, 2, 4 or 8 CCEs, which are approximately evenly distributed in time and frequency domains. In the present LTE Release 8/9/10, the demodulation of the PDCCH is based on a CRS (Common Reference Signal, common reference signal). In the LTE Release 11, the number of UEs in one cell may increase, so the PDCCH channel needs to be enhanced, and more resources need to be allocated to the PDCCH or the performance of the PDCCH needs to be improved, so as to adapt to the scheduling of more UEs in one cell. An enhanced PDCCH channel may also be referred to as an E-PDCCH (enhanced-PDCCH).

In the prior art, some RB pairs are separated from the area of a PDSCH (Physical Downlink Shared Channel, physical downlink shared channel) to serve as an area where E-PDCCH control information is sent, where the granularity is in unit of an RB pair. However, a basic unit of a PDCCH is a CCE, and an RB pair may be equivalent to resources of multiple CCEs. Therefore, the granularity of the basic unit using an RB pair as the E-PDCCH is too large, thereby causing a waste of resources.

SUMMARY

To solve the problem in the prior art, embodiments of the present invention provide a method, a device and a system for transmitting an enhanced downlink control channel.

In one aspect, a method for sending an enhanced downlink control channel is provided, including:

presetting a multiplexing unit, where the multiplexing unit includes at least one resource block pair, the at least one resource block pair includes enhanced downlink control channel E-PDCCH resources and demodulation reference DM RS resources, and the E-PDCCH resources include multiple control channel elements; and sending at least one E-PDCCH corresponding to at least one user equipment UE in at least one control channel element of the preset multiplexing unit, and sending a DM RS corresponding to the at least one UE on the DM RS resources of the preset multiplexing unit, where the at least one resource block pair is a precoding resource block group PRG, and the number of resource blocks RBs in the PRG is decided by system bandwidth.

In another aspect, a method for receiving an enhanced downlink control channel is provided, including:

receiving a signal on a multiplexing unit, where the multiplexing unit includes at least one resource block pair, the at least one resource block pair includes enhanced downlink control channel E-PDCCH resources and demodulation reference DM RS resources, and the E-PDCCH resources include multiple control channel elements;

performing channel estimation by using all DM RSs received on the multiplexing unit; and demodulating the signal received on the E-PDCCH resources in the multiplexing unit by using a result of the channel estimation, so as to obtain an E-PDCCH, where the at least one resource block pair is a precoding resource block group PRG, and the number of resource blocks RBs in the PRG is decided by system bandwidth.

In another aspect, a base station is provided, including:

a configuration module, configured to preset a multiplexing unit, where the multiplexing unit includes at least one resource block pair, the at least one resource block pair includes enhanced downlink control channel E-PDCCH resources and demodulation reference DM RS resources, and the E-PDCCH resources include multiple control channel elements; and a sending module, configured to send at least one E-PDCCH corresponding to at least one user equipment UE in at least one control channel element of the preset multiplexing unit, and send a DM RS corresponding to the at least one UE on the DM RS resources of the preset multiplexing unit, where the at least one resource block pair is a precoding resource block group PRG, and the number of resource blocks RBs in the PRG is decided by system bandwidth.

In another aspect, a user equipment UE is provided, including:

a receiving module, configured to receive a signal on a multiplexing unit, where the multiplexing unit includes at least one resource block pair, the at least one resource block pair includes enhanced downlink control channel E-PDCCH resources and demodulation reference DM RS resources, and the E-PDCCH resources include multiple control channel elements;

a channel estimation module, configured to perform channel estimation by using all DM RSs received on the multiplexing unit; and a demodulation module, configured to demodulate the signal received on the E-PDCCH resources in the multiplexing unit by using a result of the channel estimation, so as to obtain an E-PDCCH, where the at least one resource block pair is a precoding resource block group PRG, and the number of resource blocks RBs in the PRG is decided by system bandwidth.

In another aspect, a system for transmitting an enhanced downlink control channel is provided, including the base station and the user equipment UE.

In another aspect, a method for sending an enhanced downlink control channel is provided, including:

presetting a multiplexing unit, where the multiplexing unit includes at least one resource block pair, the at least one resource block pair includes enhanced downlink control channel E-PDCCH resources and demodulation reference DM RS resources, the E-PDCCH resources include multiple control channel elements, and an allocation pattern of the control channel elements in the multiplexing unit is bound to a DM RS port; and sending at least one E-PDCCH corresponding to at least one user equipment UE in at least one control channel element of the preset multiplexing unit, and sending a DM RS corresponding to the at least one UE on the DM RS resources of the preset multiplexing unit.

In another aspect, a method for receiving an enhanced downlink control channel is provided, including:

receiving a signal on a multiplexing unit, where the multiplexing unit includes at least one resource block pair, the at least one resource block pair includes enhanced downlink control channel E-PDCCH resources and demodulation reference DM RS resources, the E-PDCCH resources include multiple control channel elements, and an allocation pattern of the control channel elements in the multiplexing unit is bound to a DM RS port; and performing channel estimation by using all DM RSs received on the multiplexing unit; and demodulating the signal received on the E-PDCCH resources in the multiplexing unit by using a result of the channel estimation, so as to obtain an E-PDCCH.

In another aspect, a base station is provided, including:

a configuration module, configured to preset a multiplexing unit, where the multiplexing unit includes at least one resource block pair, the at least one resource block pair includes enhanced downlink control channel E-PDCCH resources and demodulation reference DM RS resources, the E-PDCCH resources include multiple control channel elements, and an allocation pattern of the control channel elements in the multiplexing unit is bound to a DM RS port; and a sending module, configured to send at least one E-PDCCH corresponding to at least one user equipment UE in at least one control channel element of the preset multiplexing unit, and send a DM RS corresponding to the at least one UE on the DM RS resources of the preset multiplexing unit.

In another aspect, a user equipment UE is provided, including:

a receiving module, configured to receive a signal on a multiplexing unit, where the multiplexing unit includes at least one resource block pair, the at least one resource block pair includes enhanced downlink control channel E-PDCCH resources and demodulation reference DM RS resources, the E-PDCCH resources include multiple control channel elements, and an allocation pattern of the control channel elements in the multiplexing unit is bound to a DM RS port;

a channel estimation module, configured to perform channel estimation by using all DM RSs received on the multiplexing unit; and a demodulation module, configured to demodulate the signal received on the E-PDCCH resources in the multiplexing unit by using a result of the channel estimation, so as to obtain an E-PDCCH.

In another aspect, a method for sending an enhanced downlink control channel is provided, including:

determining at least two physical resource block pairs in a physical resource block pair group, where the at least two physical resource block pairs are used for sending an enhanced downlink control channel E-PDCCH and a demodulation reference DM RS for demodulating the E-PDCCH; and precoding the E-PDCCH and the DM RS on the at least two physical resource block pairs by using the same precoding matrix.

In another aspect, a method for receiving an enhanced downlink control channel is provided, including:

receiving, by a user equipment, an enhanced downlink control channel E-PDCCH sent by a base station and a demodulation reference DM RS for demodulating the E-PDCCH on at least two physical resource block pairs in a physical resource block pair group;

precoding, by the user equipment, the E-PDCCH and the DM RS of the at least two physical resource block pairs according to the same precoding matrix used by the base station, and performing channel estimation on the DM RS of the at least two physical resource block pairs; and detecting, by the user equipment, according to a result of the channel estimation, the E-PDCCH at predetermined positions of the at least two physical resource block pairs.

In another aspect, a base station is provided, including:

a resource determination unit, configured to determine at least two physical resource block pairs in a physical resource block pair group, where the at least two physical resource block pairs are used for sending an enhanced downlink control channel E-PDCCH and a demodulation reference DM RS for demodulating the E-PDCCH; and a precoding unit, configured to precode the E-PDCCH and the DM RS on the at least two physical resource block pairs determined by the resource determination unit by using the same precoding matrix.

In another aspect, a user equipment is provided, including:

a receiving unit, configured to receive an enhanced downlink control channel E-PDCCH sent by a base station and a demodulation reference DM RS for demodulating the E-PDCCH on at least two physical resource block pairs in a physical resource block pair group;

a channel estimation unit, configured to precode the E-PDCCH and the DM RS of the at least two physical resource block pairs according to the same precoding matrix used by the base station, and perform channel estimation on the DM RS of the at least two physical resource block pairs received by the receiving unit; and a detection unit, configured to detect, according to a result of the channel estimation obtained by the channel estimation unit, the E-PDCCH at predetermined positions of the at least two physical resource block pairs.

In the method, the device and the system for transmitting an enhanced downlink control channel provided by the embodiments of the present invention, by dividing a multiplexing unit into multiple control channel elements, and sending at least one E-PDCCH corresponding to at least one UE, for each UE, the granularity of the enhanced downlink control channel is a control channel element. Compared with the granularity of an RB pair in the prior art, the granularity is reduced, resources are saved, and a downlink control channel is enhanced, thereby providing more control channels for the UE to use.

BRIEF DESCRIPTION OF DRAWINGS

To illustrate the technical solutions according to the embodiments of the present invention more clearly, the accompanying drawings for describing the embodiments are introduced briefly in the following. Apparently, the accompanying drawings in the following description are only some embodiments of the present invention, and persons of ordinary skill in the art can derive other drawings from the accompanying drawings without creative efforts.

DESCRIPTION OF EMBODIMENTS

In order to make the objectives, technical solutions and advantages of the present invention more comprehensible, the embodiments of the present invention are described in detail in the following with reference to the accompanying drawings.

Figure 1:
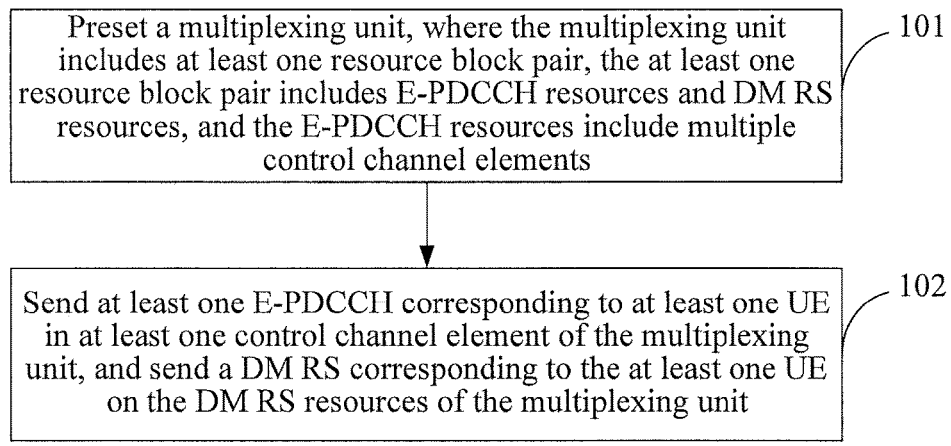
FIG. 1 is a flow chart of a method for sending an enhanced downlink control channel according to an embodiment of the present invention.

Referring to FIG. 1, an embodiment of the present invention provides a method for sending an enhanced downlink control channel, which includes the following steps.

101: Preset a multiplexing unit, where the multiplexing unit includes at least one resource block pair, the at least one resource block pair includes E-PDCCH resources and DM RS resources, and the E-PDCCH resources include multiple control channel elements.

102: Send at least one E-PDCCH corresponding to at least one UE in at least one control channel element of the preset multiplexing unit, and send a DM RS corresponding to the at least one UE on the DM RS resources of the preset multiplexing unit.

The at least one resource block pair is a PRG (Precoding Resource block Group, precoding resource block group), and the number of resource blocks RBs in the PRG is decided by system bandwidth.

The number of multiple control channel elements in the multiplexing unit may be equal or unequal to the number of UEs, which is not specifically limited in the embodiment of the present invention. For example, the E-PDCCH resources in the multiplexing unit are divided into 4 control channel elements for 4 UEs, that is, UE 1, UE 2, UE 3 and UE 4, to perform multiplexing, and a control channel element is allocated to each UE, or may also for 2 UEs, that is, UE 5 and UE 6, to perform multiplexing, and 2 control channel elements are allocated to each UE.

An executor of the sending method may be a base station, such as an eNB (evolved Node B, evolved base station).

Figure 2:
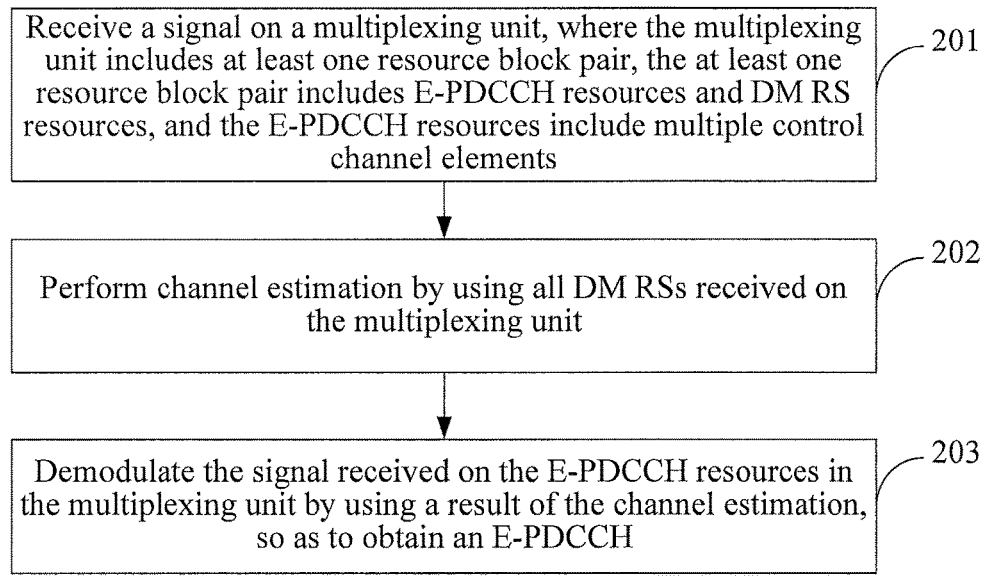
FIG. 2 is a flow chart of a method for receiving an enhanced downlink control channel according to an embodiment of the present invention.

Referring to FIG. 2, another embodiment of the present invention provides a method for receiving an enhanced downlink control channel, which includes the following steps.

201: Receive a signal on a multiplexing unit, where the multiplexing unit includes at least one resource block pair, the at least one resource block pair includes E-PDCCH resources and DM RS resources, and the E-PDCCH resources include multiple control channel elements.

202: Perform channel estimation by using all DM RSs received on the multiplexing unit.

203: Demodulate the signal received on the E-PDCCH resources in the multiplexing unit by using a result of the channel estimation, so as to obtain an E-PDCCH;

The at least one resource block pair is a PRG, and the number of resource blocks RBs in the PRG is decided by the system bandwidth.

An executor of the receiving method may specifically be a UE.

In the foregoing two methods, each UE has its respective E-PDCCH and DM RS, the E-PDCCH is transmitted on the E-PDCCH resources and the DM RS is transmitted on the DM RS resources.

In the method for sending an enhanced downlink control channel and the method for receiving an enhanced downlink control channel provided by the embodiments of the present invention, by dividing a multiplexing unit into multiple control channel elements, and sending at least one E-PDCCH corresponding to at least one UE, for each UE, the granularity of the enhanced downlink control channel is a control channel element. Compared with the granularity of an RB pair in the prior art, the granularity is reduced, resources are saved, and the downlink control channel is enhanced, thereby providing more control channels for the UE to use.

Figures 3, 4:
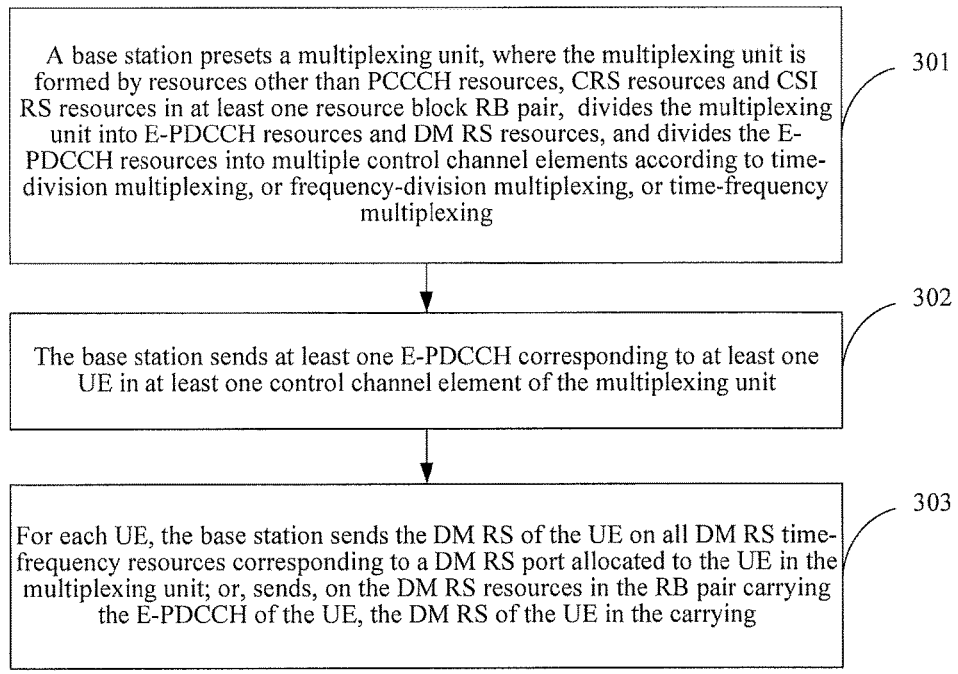
FIG. 3 is another flow chart of the method for sending an enhanced downlink control channel according to an embodiment of the present invention.
FIG. 4 is a schematic diagram of dividing control channel elements in a multiplexing unit according to an embodiment of the present invention.

Referring to FIG. 3, another embodiment of the present invention provides a method for sending an enhanced downlink control channel, which includes the following steps.

301: A base station presets a multiplexing unit, where the multiplexing unit is formed by resources other than PCCCH resources, CRS resources and CSI RS (Channel-State Information Reference Signal, channel-state information reference signal) resources in at least one resource block RB pair, and divides the multiplexing unit into E-PDCCH resources and DM RS resources, and divides the E-PDCCH resources into multiple control channel elements according to time-division multiplexing, or frequency-division multiplexing, or time-frequency multiplexing.

The multiplexing unit includes at least one RB pair, such as, 2 RB pairs, 3 RB pairs or 4 RB pairs, which is not specifically limited in the embodiment of the present invention. A division result of the multiplexing unit may be configured and stored in advance at a base station side in the form of a multiplexing pattern (pattern).

Referring to FIG. 4, FIG. 4 is a schematic diagram of the division of multiple control channel elements in a multiplexing unit. DM RS resources are shown in FIG. 4, and only that E-PDCCH resources include multiple control channel elements is taken as an example for illustration. 2 RB pairs are used as a multiplexing unit and each RB pair includes E-PDCCH resources and DM RS resources, where the E-PDCCH resources are divided into 4 control channel elements, for multiplexing by two UEs, for example, UE 1 occupies 2 control channel elements in RB pair 1 and also occupies 2 control channel elements in RB pair 2, and UE 2 occupies 2 control channel elements in RB pair 1 and also occupies 2 control channel elements in RB pair 2.

In the embodiment of the present invention, the E-PDCCH resources refer to resources other than the DM RS resources. The number of REs included in the DM RS resources in an RB pair is not fixed, so the number of REs included in the E-PDCCH resources is also not fixed, and the number is related to the number of CRS ports configured by a base station and the number of REs included in the DM RS resources.

In this embodiment, a CRS port refers to a logical port configured by a base station to transmit a CRS, and the number of CRS ports configured by the base station may be 1, 2 or 4, which is not specifically limited. The DM RS resources may include 12 REs or 24 REs, which is not specifically limited. The number of REs included by the DM RS resources may be determined according to the number of DM RS ports. A DM RS port refers to a logical port configured by a base station to transmit a DM RS, and the number of CRS ports may be 2 or 4. For example, if the number of DM RS ports is 2, the DM RS resources include 12 REs, and if the number of DM RS ports is 4, the DM RS resources include 24 REs.

Referring to Table 1, Table 1 is the correspondence between the number of REs in DM RS resources and a CRS port and the number of REs that may send data in an RB pair. By taking a normal subframe as an example, it is assumed that the front 3 OFDM symbols are PDCCH, and Table 1 shows the number of REs that may send data in an RB pair under different numbers of configured CRS and DM RS ports.

TABLE 1

| CRS port and DM RS configuration | The number of REs that may send data in an RB pair |
| --- | --- |
| 1 CRS port and DM RSs of 12 REs | 114 |
| 2 CRS ports and DM RSs of 12 REs | 108 |
| 4 CRS ports and DM RSs of 12 REs | 104 |
| 1 CRS ports and DM RSs of 24 REs | 102 |
| 2 CRS ports and DM RSs of 24 REs | 96 |
| 4 CRS ports and DM RSs of 24 REs | 92 |

For example, the number of CRS ports is 4, the DM RS resources have 12 REs, and the front 3 OFDM symbols of a normal subframe are PDCCH, so an RB pair includes 12×14=168 REs in total, where the PDCCH occupies 12×3=36 REs of the front 3 OFDM symbols in total, the DM RS occupies 12 REs, and the CRS outside the PDCCH area occupies 16 REs, so the number of REs that may send data in the RB pair is: 168−36−12−16=104, as recorded in the third row of Table 1.

In this embodiment, dividing the E-PDCCH resources according to time-division multiplexing refers to that multiple control channel elements obtained after dividing occupy the same carriers on a frequency domain, for example, including 12 carriers, but occupy different OFDM symbols in a time domain. Dividing the E-PDCCH resources according to frequency-division multiplexing refers to that the multiple control channel elements obtained after dividing include the same OFDM symbol in the time domain, but occupy different carriers in the frequency domain. For example, a control channel element occupies the front 6 carriers and another control channel element occupies the rear 6 carriers. Dividing the E-PDCCH resources according to time-frequency multiplexing refers to that the multiple control channel elements obtained after dividing occupy different carriers in the frequency domain and also occupy different OFDM symbols in the time domain.

302: The base station sends at least one E-PDCCH corresponding to at least one UE in at least one control channel element of the multiplexing unit.

The at least one UE may be one or more UEs. For example, a base station sends two E-PDCCHs corresponding to one UE, where one is an E-PDCCH used in uplink scheduling, and the other is an E-PDCCH used in downlink scheduling. In another example, the base station sends 3 E-PDCCHs, corresponding to 3 UEs, respectively; alternatively, the base station sends 3 E-PDCCHs, where two of them are corresponding to UE 1 and another is corresponding to UE 2.

Specifically, when the at least one UE is multiple UEs, the E-PDCCH of the multiple UEs may be sent in at least two control channel elements of the multiple control channel elements in the multiplexing unit according to time-division multiplexing, or frequency-division multiplexing, or time-frequency multiplexing, which is not specifically limited in the embodiment of the present invention.

303: For each UE in the at least one UE, the base station sends the DM RS of the UE on all DM RS time-frequency resources corresponding to a DM RS port allocated to the UE in the multiplexing unit; or, sends, on the DM RS resources in the RB pair carrying the E-PDCCH of the UE, the DM RS of the UE.

The base station may allocate the DM RS port to the UE in advance, and when sending the DM RS of a UE, the base station sends the DM RS of the UE on all DM RS time-frequency resources corresponding to the DM RS port allocated to the UE. When needing to send the E-PDCCHs of multiple UEs, the base station sends the DM RS of the UE for each UE thereof according to the method. For example, the base station allocates DM RS ports, port 7 and port 8, to UE 1 and UE 2, respectively, so the base station sends the DM RS of UE 1 on all DM RS time-frequency resources of port 7, and sends the DM RS of UE 2 on all DM RS time-frequency resources of port 8

For a multiplexing unit, the E-PDCCH of a UE may be carried in an RB pair of the multiplexing unit, or may be carried in multiple RB pairs of the multiplexing unit, or even in all RB pairs, so the base station may send the DM RS of the UE on the DM RS resources in the RB pair carrying the E-PDCCH of the UE, and does not send the DM RS of the UE in the RB pair that does not carry the E-PDCCH of the UE.

In this embodiment, furthermore, when the at least one UE is multiple UEs, different DM RS ports may also be allocated to the multiple UEs, or the same DM RS port may be allocated to at least two UEs in the multiple UEs.

If the same DM RS port is allocated to the at least two UEs in the multiple UEs, each UE allocated the same DM RS port may use different precoding matrixes, but the DM RS port of each UE interferes with each other, and the effect of channel estimation is poor. Alternatively, the UEs allocated the same DM RS port may also use the same precoding matrix for precoding, but cannot perform precoding for each UE by using the optimal precoding matrix, and cannot obtain the optimal beamforming gain (beamforming gain). Therefore, preferably, different DM RS ports are allocated to the multiple UEs. For example, two UEs perform multiplexing, the DM RS port allocated to UE 1 is port 7 (port 7), and the DM RS port allocated to UE 2 is port 8 (port 8), which are not specifically limited in the embodiment of the present invention. Different UEs use different DM RS ports, so when sending the E-PDCCH to each UE, the base station may perform precoding for each user by using the optimal precoding matrix.

Figure 5:
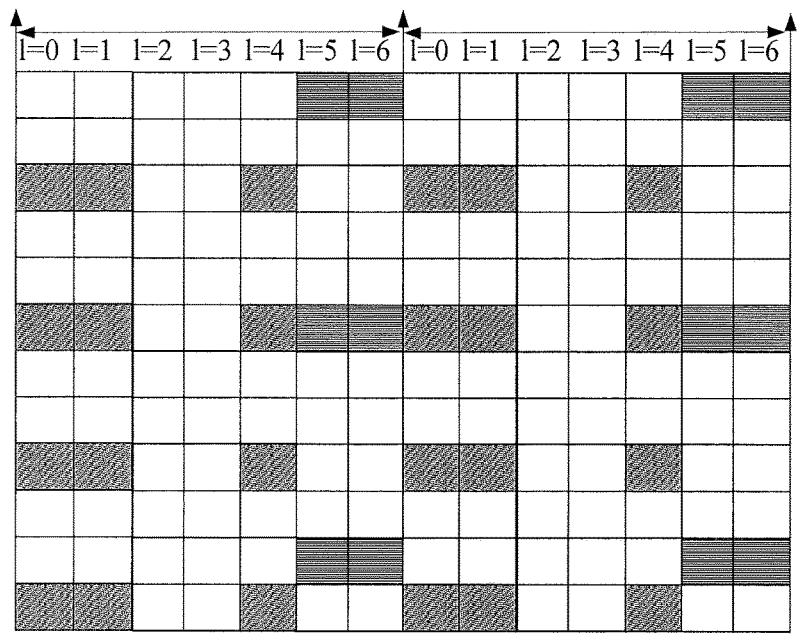
FIG. 5 is a schematic diagram of DM RS resources in an RB pair of a normal CP length.
Figure 6:
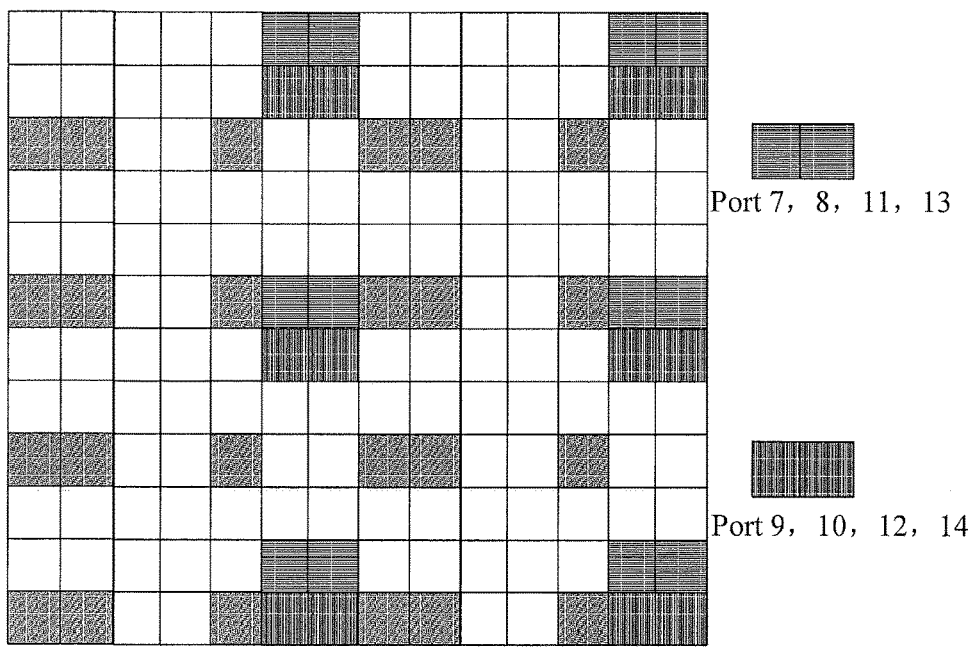
FIG. 6 is another schematic diagram of DM RS resources in an RB pair of a normal CP length.

Referring to FIG. 5, FIG. 5 is a schematic diagram of a DM RS in an RB pair of a normal CP length. The positions of DM RS ports 7 and 8 in time and frequency domains are given, and the RB pair includes DM RS resources of 12 REs and supports the DM RSs of two ports: the DM RS ports 7 and 8. Referring to FIG. 6, FIG. 6 is another schematic diagram of a DM RS in an RB pair of a normal CP length. The RB pair includes DM RS resources of 24 REs and can support DM RSs of 8 ports at most. Ports 7, 8, 11 and 13 are sent on the REs of the DM RSs marked as horizontal stripes, and ports 9, 10, 12 and 14 are sent on the REs of the DM RSs marked as vertical stripes.

In this embodiment, a spreading sequence used by a base station in a precoding process may be shown in Table 2, and Table 2 is a spreading sequence in normal CP. For example, when the DM RS port is port 8, the length of a spreading code is 4 and its spreading code is [+1, −1, +1, −1], in the DM RS position of the frequency domain in an OFDM symbol in the $5^{th}$ time domain in an even-numbered slot, the corresponding DM RS pilot in the DM RS position is multiplied by $\bar{w}_p(0)=1$; in the DM RS position of the frequency domain in an OFDM symbol in the $6^{th}$ time domain in the even-numbered slot, the corresponding DM RS pilot in the DM RS position is multiplied by $\bar{w}_p(1)=-1$; in the DM RS position of the frequency domain in an OFDM symbol in the $5^{th}$ time domain in an odd-numbered slot, the corresponding DM RS pilot in the DM RS position is multiplied by $\bar{w}_p(0)=1$; and in the DM RS position of the frequency domain in an OFDM symbol in the $6^{th}$ time domain in the odd-numbered slot, the corresponding DM RS pilot in the DM RS position is multiplied by $\bar{w}_p(1)=-1$.

TABLE 2

| Antenna port p | [$\bar{w}_p(0)$ $\bar{w}_p(1)$ $\bar{w}_p(2)$ $\bar{w}_p(3)$] |
| --- | --- |
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

Through the positions of the time and frequency domains and the corresponding spreading sequence of the DM RS, ports of different DM RSs are formed.

In this embodiment, in any one of the foregoing division manners for performing time-division multiplexing, frequency-division multiplexing or time-frequency multiplexing on the E-PDCCH resources, the multiple control channel elements obtained after dividing may be distributed in a localized manner or in an alternate manner. Specific examples are taken for respective illustration as follows.

Figure 7:
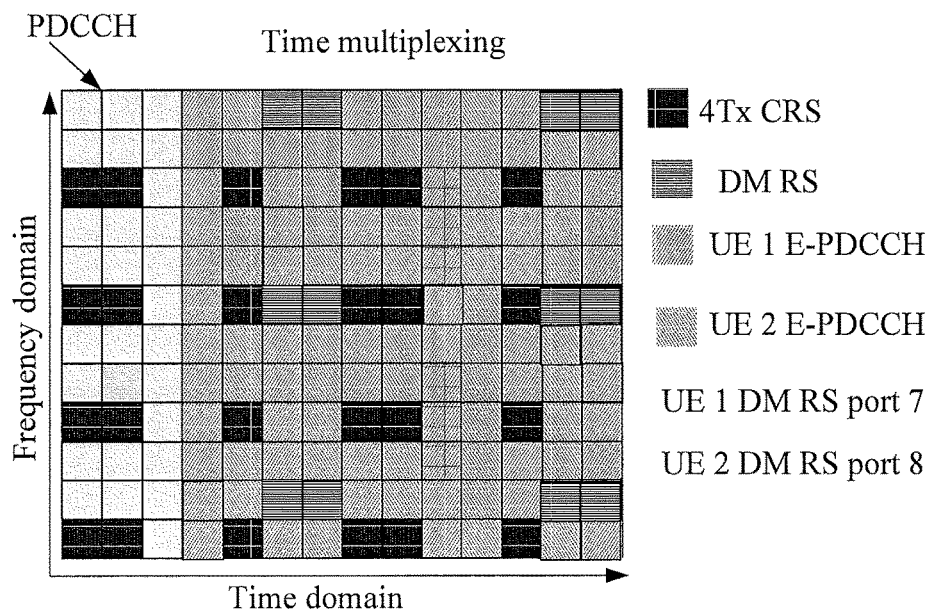
FIG. 7 is a schematic diagram of time-division multiplexing of two UEs according to an embodiment of the present invention.

Referring to FIG. 7, the first example is a schematic diagram of an RB pair of time-division multiplexing of 2 UEs. A multiplexing unit includes an RB pair, multiplexing is performed on two UEs, that is, UE 1 and UE 2, the number of CRS ports is 4, and DM RS resources include 12 REs. 2 control channel elements are obtained by dividing in the time domain, where the first control channel element occupies the $4^{th}$, $6^{th}$, $8^{th}$, $10^{th}$, $12^{th}$ and $14^{th}$ OFDM symbols in the time domain direction, and the second control channel element occupies the $5^{th}$, $7^{th}$, $9^{th}$, $11^{th}$ and $13^{th}$ OFDM symbols in the time domain direction, which belong to alternate distribution. In the frequency domain, both control channel elements occupy 12 carriers and have the same carrier resources. The first control channel element is allocated to UE 1, and the second control channel element is allocated to UE 2, so as to enhance the PDCCH, so that the E-PDCCH signals of UE 1 and UE 2 are sent on different OFDM symbols alternately. Furthermore, the DM RS ports of UE 1 and UE 2 may be configured as different ports, such as port 7 and port 8, respectively.

Figure 8:
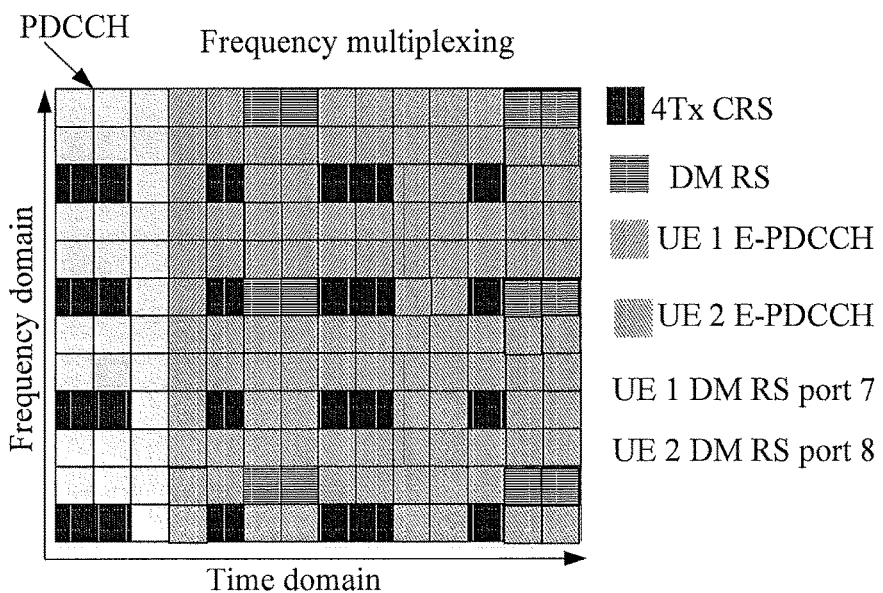
FIG. 8 is a schematic diagram of frequency-division multiplexing of two UEs according to an embodiment of the present invention.

Referring to FIG. 8, the second example is a schematic diagram of an RB pair of frequency-division multiplexing of 2 UEs. A multiplexing unit includes an RB pair for multiplexing of two UEs, that is, UE 1 and UE 2, the number of CRS ports is 4, and DM RS resources include 12 REs. 2 control channel elements are obtained by dividing in the frequency domain, where the first control channel element occupies the rear 6 carriers in the frequency domain direction, and the second control channel element occupies the front 6 carriers in the frequency domain direction, which belong to localized distribution. In the time domain, both control channel elements occupy 11 same OFDM symbols and have the same time domain resources. The first control channel element is allocated to UE 1, and the second control channel element is allocated to UE 2, so as to enhance the PDCCH, so that E-PDCCH signals of UE 1 and UE 2 are sent on different carriers. Furthermore, the DM RS ports of UE 1 and UE 2 may be configured as different ports, such as port 7 and port 8, respectively. Of course, the first control channel element may also be allocated to UE 2 to occupy the rear 6 frequency domain resources, and the second control channel element may be allocated to UE 1 to occupy the front 6 frequency domain resources, which are not specifically limited in the embodiment of the present invention.

Figure 9A:
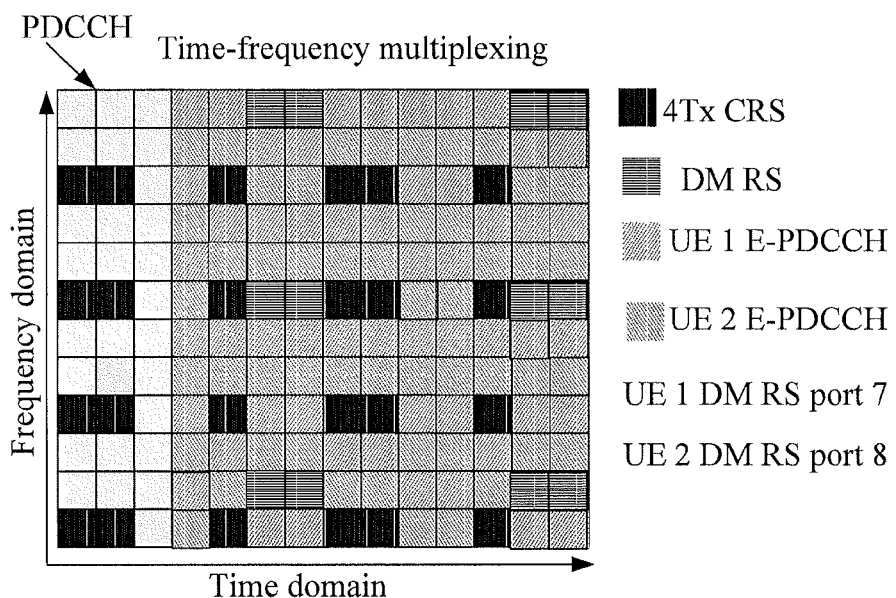
FIG. 9a and FIG. 9b are schematic diagrams of time-frequency multiplexing of two UEs according to an embodiment of the present invention.
Figure 9B:
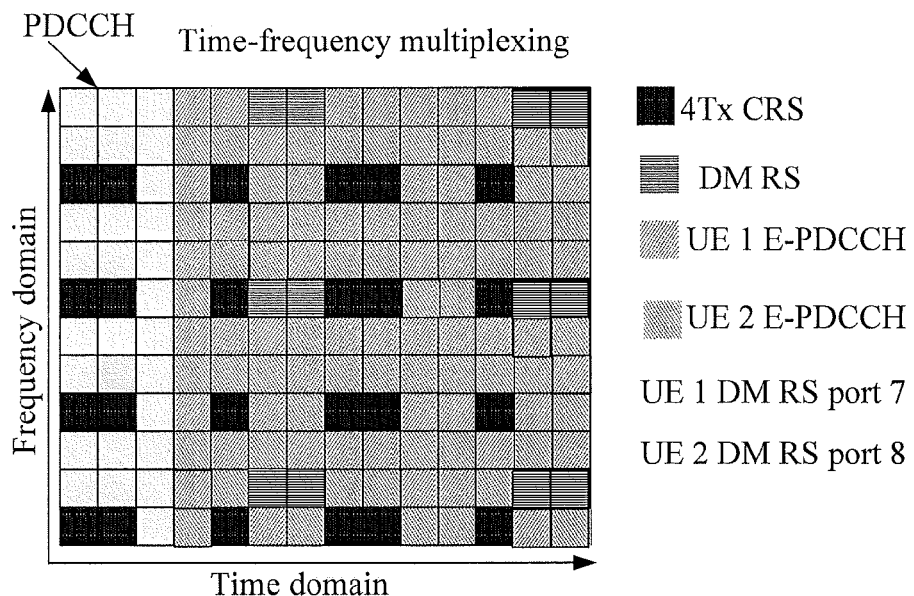

Referring to FIG. 9a and FIG. 9b, the third example is a schematic diagram of an RB pair of time-frequency multiplexing of 2 UEs. The difference from the foregoing two examples lies in that, two control channel elements in an RB pair occupy different resources in the time domain, and also occupy different resources in the frequency domain, which belong to alternate distribution. Referring to FIG. 9a, in a resource list of the vertical frequency domain corresponding to each OFDM symbol, in the order from top to bottom with UE 1 coming first and UE 2 coming next, the control channel elements are alternately allocated to the two UEs, that is, in the 12 carriers in each list, except that pilot resources include CRS resources and DM RS resources, the rest carrier resources are occupied alternately in the order with UE 1 coming first and UE 2 coming next. Referring to FIG. 9b, in the order from top to bottom in the frequency domain first and then from left to right in the time domain, and in the order with UE 1 coming first and UE 2 coming next, the control channel elements are allocated, that is, starting from the $4^{th}$ OFDM symbol in FIG. 9b, in the order from the $4^{th}$ to the $14^{th}$ OFDM symbol, and in the carrier order from top to bottom in the frequency domain resource list corresponding to each OFDM symbol, resources except pilot resources are allocated to UE 1 and UE 2 alternately.

Figure 10A:
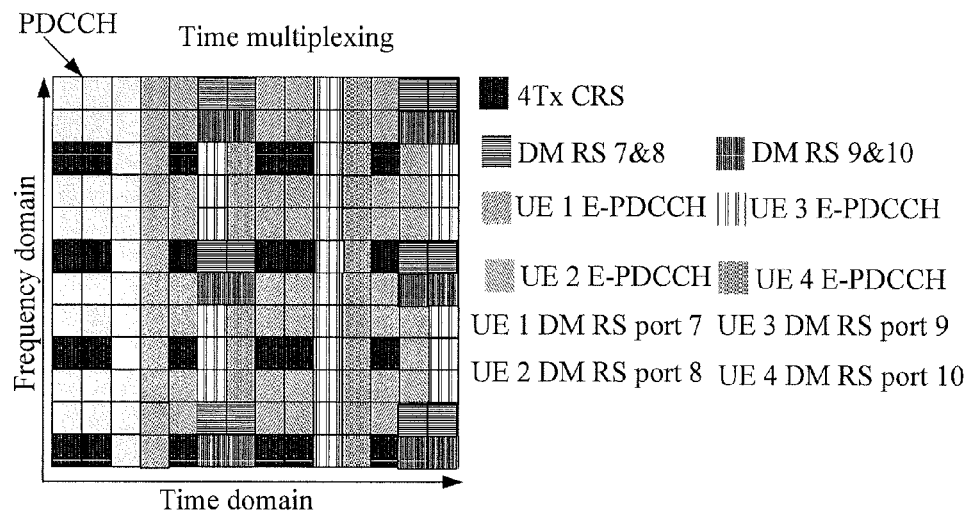
FIG. 10a, FIG. 10b and FIG. 10c are schematic diagrams of time-frequency multiplexing of 4 UEs according to an embodiment of the present invention.
Figure 10B:
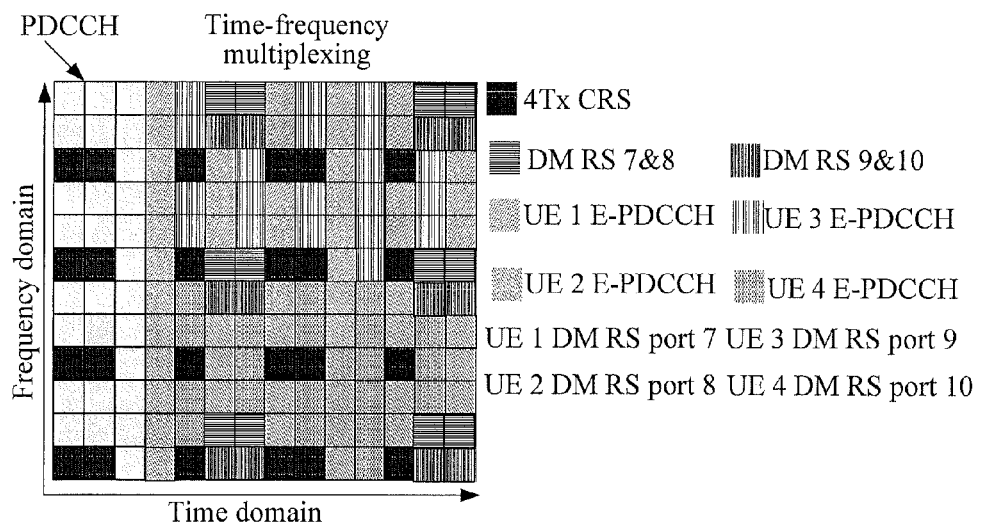
Figure 10C:
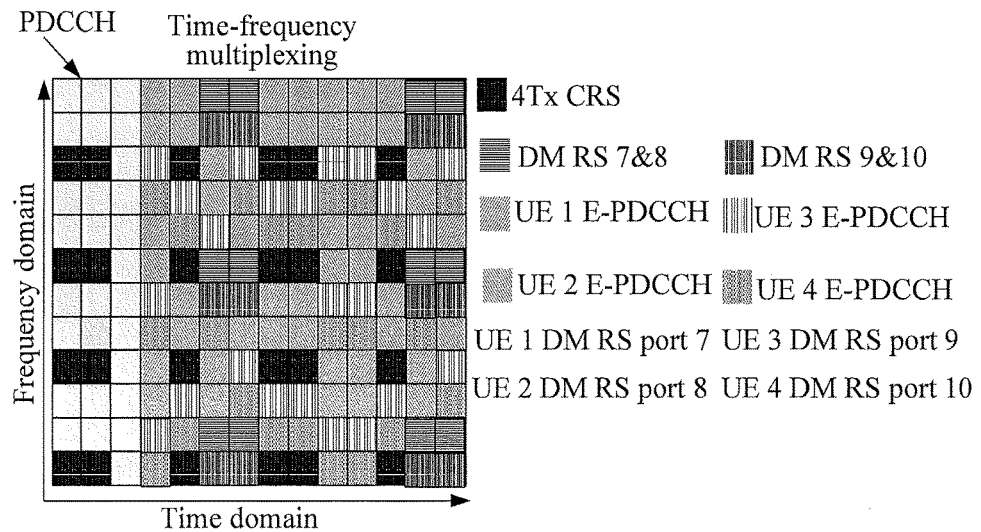

Referring to FIG. 10a, FIG. 10b and FIG. 10c, the fourth example is a schematic diagram of an RB pair of time-frequency multiplexing of 4 UEs. The difference from the foregoing 3 examples lies in that, multiplexing is performed for 4 UEs, the DM RS includes 24 REs and 4 ports, and the 4 ports are allocated to 4 UEs, respectively. For example, the ports allocated to UE 1, UE 2, UE 3 and UE 4 are port 7, port 8, port 9 and port 10, respectively.

Referring to FIG. 10a, similar to the first example, which is time-division multiplexing, 4 control channel elements are obtained by dividing in the time domain and alternately allocated in the order from UE 1, UE 2, UE 3 to UE 4, where the first control channel element allocated to UE 1 occupies the $4^{th}$, $8^{th}$ and $12^{th}$ OFDM symbols in the time domain direction, the second control channel element allocated to UE 2 occupies the $5^{th}$, $9^{th}$ and $13^{th}$ OFDM symbols in the time domain direction, the third control channel element allocated to UE 3 occupies the $6^{th}$, $10^{th}$ and $14^{th}$ OFDM symbols in the time domain direction, and the fourth control channel element allocated to UE 4 occupies the $7^{th}$ and $11^{th}$ OFDM symbols in the time domain direction, which belong to alternate distribution.

Referring to FIG. 10b, similar to the second example, which is time-frequency multiplexing. The frequency domain resource list where each OFDM symbol is located is divided into two parts, allocated to 2 UEs, respectively, and 2 OFDM symbols are taken as a group to be allocated to 4 UEs. Specifically, starting from the $4^{th}$ OFDM symbol, in the order from the $4^{th}$ to the $14^{th}$ OFDM symbol, for every two adjacent frequency domain resource lists, the first list is allocated to UE 1 and UE 2 and the second list is allocated to UE 3 and UE 4, which are then allocated in sequence alternately.

Referring to FIG. 10c, similar to the multiplexing in FIG. 9b, which is time-frequency multiplexing. In the order from top to down in the frequency domain first and then from left to right in the time domain, and in the order from UE 1, UE 2, UE 3 to UE 4, the control channel elements are allocated, that is, starting from the $4^{th}$ OFDM symbol in the figure, in the order from the $4^{th}$ to the $14^{th}$ OFDM symbol, and in the carrier order from top to bottom in the frequency domain resource list corresponding to each OFDM symbol, resources except pilot resources are allocated to UE 1, UE 2, UE 3 and UE 4 alternately.

In the embodiment of the present invention, to improve the performance of channel estimation, multiple RB pairs may be used as a multiplexing unit, and on all DM RS resources in the multiplexing unit, including DM RS resources on each RB pair, pilot signals of the multiple UEs are sent, thereby using the DM RSs of all RB pairs in the multiplexing unit to perform channel estimation. Compared with only using an RB pair to perform channel estimation, the performance of the channel estimation is improved. By taking FIG. 4 as an example, the multiplexing unit includes 2 RB pairs, 4 control channel elements are obtained by dividing from each RB pair to be allocated to 2 UEs, and each UE occupies 2 control channel elements, so DM RS signals of UE 1 and UE 2 may be sent on DM RS resources of RB pair 1 and RB pair 2. Specifically, different DM RS ports may be used for sending the DM RS signals of UE 1 and UE 2, respectively, for example, UE 1 uses DM RS port 7 and UE 2 uses DM RS port 8, and so on.

In this embodiment, the PRG is used as a multiplexing unit for multiplexing, and the number of RB pairs in the PRG is decided by the system bandwidth. For the correspondence between the system bandwidth and the precoding granularity, reference may be made to Table 3.

TABLE 3

| System bandwidth (PRB) | Size of PRG in a multiplexing unit (RB pair) |
|---|---|
| ≤10 | 1 |
| 11-26 | 2 |
| 27-63 | 3 |
| 64-110 | 2 |

In Table 3, the size of a PRG indicates that, in the corresponding system bandwidth, for a UE, several RB pairs are precoded by using the same precoding matrix. For example, when the system bandwidth is 25 RBs, the PRG is 2 RB pairs, in 25 RBs of the system bandwidth, every two RB pairs are precoded by using the same precoding matrix, so 2 RB pairs in the PRG may be multiplexed as a multiplexing unit. The multiple control channel elements obtained by dividing in the PRG are for multiplexing of multiple UEs, and different UEs occupy different control channel elements. For the DM RS of a UE, as long as the UE transmits the E-PDCCH in the PRG, the DM RS signals of the UE may be sent in all RB pairs in the PRG, or, the DM RS signals of the UE are sent only in the RB pair carrying the E-PDCCH of the UE in the PRG. When the DM RS signals of the UE are sent on each PRB in the PRG, joint channel estimation may be performed on multiple PRBs, thereby improving the performance of the channel estimation.

In the embodiment of the present invention, the number of control channel elements obtained by dividing from a multiplexing unit, and information such as a control channel element and DM RS port mapped by the UE may be notified to the UE by the base station through signaling, and the signaling notification may be an RRC (Radio Resource Control, radio resource control) signaling semi-static notification; or an allocation pattern of the control channel elements in the multiplexing unit may also be bound to the DM RS port, and the binding relationship is allocated and configured at the base station side and the UE side. For example, by taking FIG. 7 as an example, an allocation solution of the pattern is used, UE 1 is bound to the DM RS port 7 and UE 2 is bound to the DM RS port 8, so the base station does not need to notify the UE again separately.

In an optional implementation manner of this embodiment, an aggregation level of an E-PDCCH may be 1, 2, 4 or 8, that is, an E-PDCCH may be transmitted by 1, 2, 4 or 8 control channel elements. The E-PDCCH may be divided into a localized (Localized) E-PDCCH and a distributed (Distributed) E-PDCCH. The distributed E-PDCCH may be sent in a transmit diversity manner; and the localized E-PDCCH may be sent in a precoding or beam attachment manner. In the implementation manner, the localized E-PDCCH is further discussed.

Figure 10D:
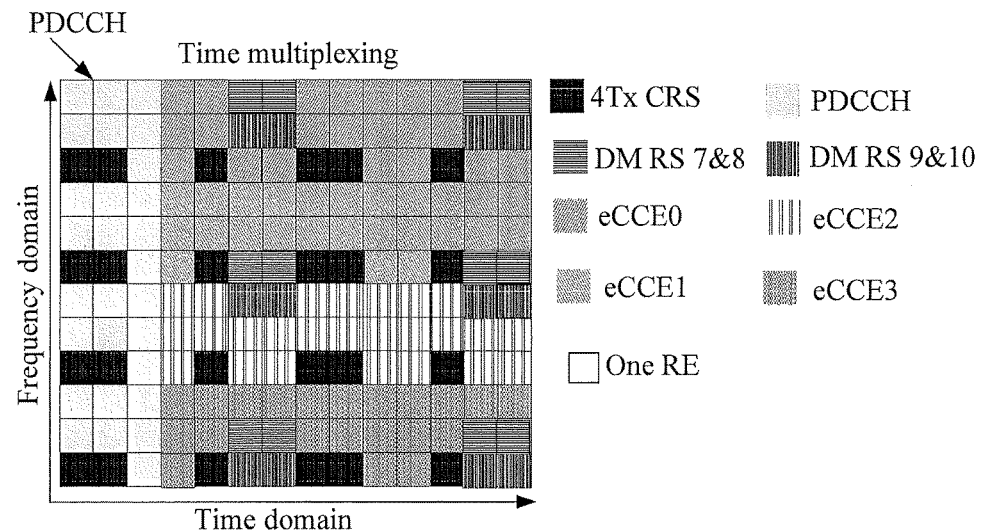
FIG. 10d is a schematic diagram of an allocation pattern of control channel elements in a multiplexing unit.

Referring to FIG. 10d, FIG. 10d shows an allocation pattern of control channel elements in a multiplexing unit. FIG. 10d only shows an RB pair in the multiplexing unit. Each RB pair in the multiplexing unit may include multiple control channel elements. For example, the allocation pattern of the control channel elements shown in FIG. 10d includes control channel elements eCCE0 to eCCE3. It should be noted that, in the allocation pattern shown in FIG. 10d, 12 subcarriers in an RB pair are divided into 4 parts and a part occupies 3 subcarriers. Each control channel element occupies 3 subcarriers and occupies k (k is an integer) OFDM symbols in the time domain. However, this embodiment is not limited to the division of an RB pair into 4 control channel elements, and multiple control channel elements may also be divided from an RB pair.

The binding relationship between the allocation pattern of the control channel elements in the multiplexing unit and the DM RS port may be that: eCCE0 is bound to a DM RS port 7, eCCE1 is bound to a DM RS port 8, eCCE2 is bound to a DM RS port 9, and eCCE3 is bound to a DM RS port 10. If the aggregation level of an E-PDCCH to be sent is 1, in the allocation pattern of the control channel elements shown in FIG. 10d, a first E-PDCCH may be sent on eCCE0, a DM RS corresponding to the first E-PDCCH may be sent on the DM RS port 7; a second E-PDCCH may be sent on eCCE1, a DM RS corresponding to the second E-PDCCH may be sent by the DM RS port 8; and so on.

Considering the same port may be used for an E-PDCCH in an RB pair, and the aggregation level of an E-PDCCH may be greater than 1, for example, the aggregation level may be 2, and the binding relationship between the allocation pattern of the control channel elements in the multiplexing unit and the DM RS port may be that: eCCE0 and eCCE1 are bound to a DM RS port x, and eCCE2 and eCCE3 are bound to a DM RS port y. In this way, if the aggregation level of an E-PDCCH to be sent is 2, in the allocation pattern of the control channel elements shown in FIG. 10e, a first E-PDCCH may be sent on eCCE0 and eCCE1, a DM RS corresponding to the first E-PDCCH may be sent on the DM RS port x; a second E-PDCCH may be sent on eCCE2 and eCCE3, and a DM RS corresponding to the second E-PDCCH may be sent by the DM RS port y. The DM RS ports x and y may be any one of DM RS ports 7, 8, 9 and 10, and the port x and the port y may be different.

Figure 10E:
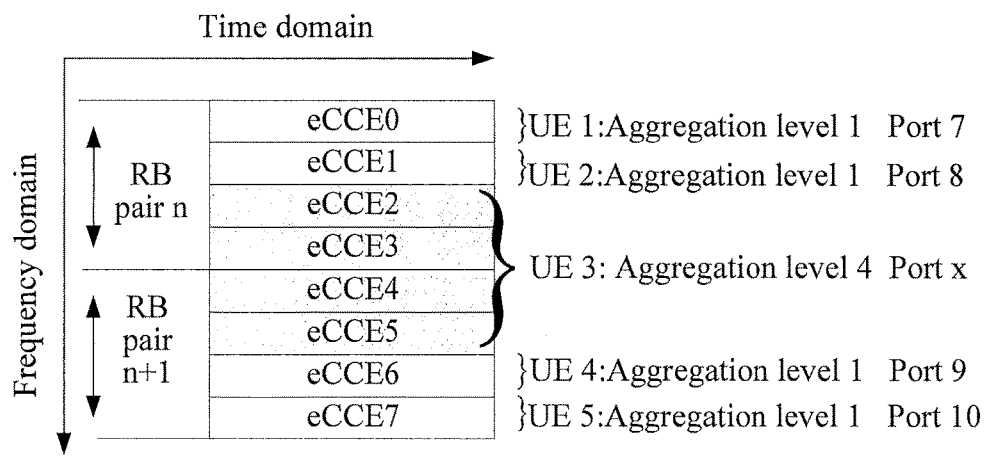
FIG. 10e is a schematic diagram of a binding relationship between an allocation pattern of the control channel elements in a multiplexing unit and a DM RS port.

Referring to FIG. 10e, FIG. 10e shows a binding relationship between an allocation pattern of control channel elements in a multiplexing unit and a DM RS port. Still by taking that an RB pair includes 4 control channel elements as an example, that is, an RB pair n includes control channel elements eCCE0 to eCCE3, and an RB pair (n+1) includes control channel elements eCCE4 to eCCE7. If the aggregation level of an E-PDCCH is greater than 1, for example, the aggregation level is 4, multiple RB pairs may need to be occupied. Therefore, the binding relationship between the allocation pattern of the control channel elements in the multiplexing unit and the DM RS port may further be that: eCCE0 is bound to the DM RS port 7, eCCE1 is bound to the DM RS port 8, eCCE2 to eCCE5 are bound to the DM RS port x, eCCE6 is bound to the DM RS port 9, and eCCE7 is bound to the DM RS port 10. eCCE0, eCCE1, eCCE6 and eCCE7 may be used for sending the E-PDCCH whose aggregation level is 1, and sending the DM RS in the corresponding bound DM RS ports 7 to 10. eCCE2 to eCCE5 may be used for sending the E-PDCCH whose aggregation level is 4, and sending the DM RS in the corresponding bound DM RS port x. The DM RS port x may be DM RS port 7, 8, 9 or 10.

For example, when the aggregation level of a user UE 3 is 4, an E-PDCCH of UE 3 may be sent on eCCE2 to eCCE5 of the RB pair n and the RB pair (n+1). In addition, when the E-PDCCH of the UE1 whose aggregation level is 1 is sent on eCCE0 of the RB pair n, UE 1 performs channel estimation by using the DM RS received on the DM RS port 7; when the E-PDCCH of UE 2 whose aggregation level is 1 is sent on eCCE1 of the RB pair n, UE 2 performs channel estimation by using the DM RS received by the DM RS port 8; when the E-PDCCH of UE 4 whose aggregation level is 1 is sent on eCCE6 of the RB pair (n+1), UE 4 performs channel estimation by using the DM RS received on the DM RS port 9; and when the E-PDCCH of UE 5 whose aggregation level is 1 is sent on eCCE7 of the RB pair (n+1), UE 5 performs channel estimation by using the DM RS received on the DM RS port 10. For UE 3, if the DM RS port bound to eCCE2 to eCCE5 is 7 or 8, UE 3 needs to perform channel estimation by using the DM RS received on the DM RS port 7 or 8, but the DM RS port used by UE 3 is in conflict with the DM RS port of UE 1 or UE 2 in the $n^{th}$ RB pair. If the DM RS port bound to eCCE2 to eCCE5 is 9 or 10, the DM RS port used by UE 3 is in conflict with the DM RS port of UE 4 or UE 5 in the $(n+1)^{th}$ RB pair.

To avoid the foregoing conflict, one method is: if the E-PDCCH of UE 3 whose aggregation level is 4 uses the port 9, the E-PDCCH of other users whose aggregation level is 1 is not carried on eCCE6 of the RB pair (n+1).

Figure 10F:
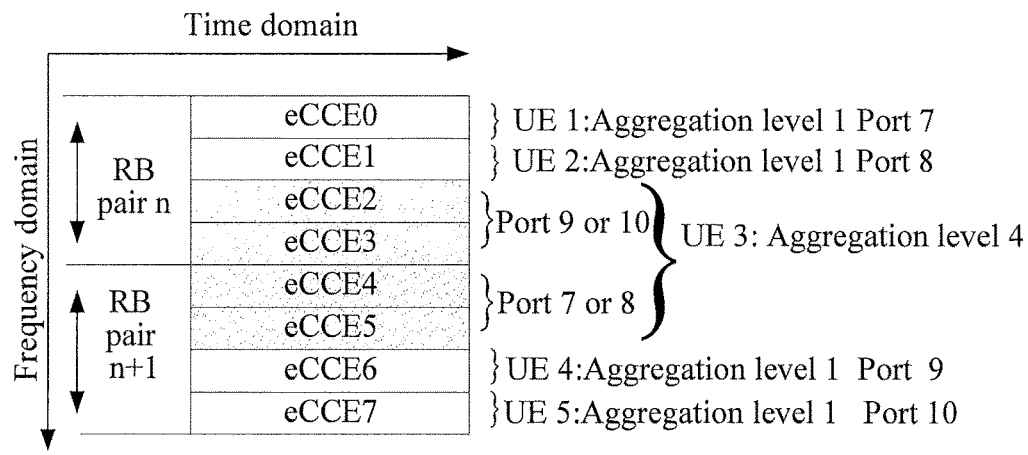
FIG. 10f is another schematic diagram of a binding relationship between an allocation pattern of the control channel elements in a multiplexing unit and a DM RS port.

Referring to FIG. 10f, FIG. 10f shows a binding relationship between an allocation pattern of control channel elements in another multiplexing unit and a DM RS port. The difference between the binding relationship shown in FIG. 10f and the binding relationship shown in FIG. 10e is that eCCE2 to eCCE3 are bound to the DM RS port 9 or 10, and eCCE4 to eCCE5 are bound to the DM RS port 7 or 8. When the aggregation level of a user UE 3 is 4, an E-PDCCH of UE 3 may be sent on eCCE2 to eCCE5 of the RB pair n and RB pair (n+1). At this time, the DM RS port 9 or 10 is used for sending the DM RSs corresponding to eCCE2 and eCCE3, and the DM RS port 7 or 8 is used for sending the DM RSs corresponding to eCCE4 and eCCE5. In this way, UE 3 is not in conflict with the DM RS ports of other UEs in the RB pairs n and (n+1).

On the basis of the method for sending an enhanced downlink control channel shown in FIG. 3, the receiving of the enhanced downlink control channel may also be performed by adopting the method shown in FIG. 2. A specific process is the same as the description in the foregoing embodiments, which is not repeated again herein.

In the method for sending an enhanced downlink control channel provided by the embodiment of the present invention, by dividing a multiplexing unit into multiple control channel elements, and sending at least one E-PDCCH of at least one UE, for each UE, the granularity of the enhanced downlink control channel is a control channel element. Compared with the granularity of an RB pair in the prior art, the granularity is reduced, resources are saved, and the downlink control channel is enhanced, thereby providing more control channels for the UE to use. The multiplexing unit may be divided into multiple control channel elements in time-division multiplexing, or frequency-division multiplexing, or time-frequency multiplexing, the multiple control channel elements may be distributed in a localized manner or in an alternate manner in various implementation manners, and the application is flexible and convenient.

The forgoing embodiment is a scenario that the E-PDCCH of a UE is transmitted through one layer only, and the embodiment of the present invention may further be applied in a scenario that the E-PDCCH of a UE is transmitted through multiple layers. For example, in two-layer transmission for UE 1, UE 1 needs the pilots of two DM RS ports to estimate the channels of two layers, respectively, a DM RS port 7 and a DM RS port 8 may be allocated to UE 1, and if other UEs need to multiplex with UE 1, different DM RS ports may be used for other UEs.

Figure 11:
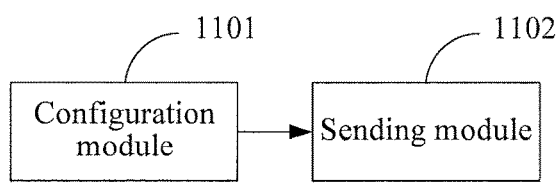
FIG. 11 is a structural diagram of a base station according to an embodiment of the present invention.

Referring to FIG. 11, another embodiment of the present invention provides a base station, including:

a configuration module 1101, configured to preset a multiplexing unit, where the multiplexing unit includes at least one resource block pair, the at least one resource block pair includes enhanced downlink control channel E-PDCCH resources and demodulation reference DM RS resources, and the E-PDCCH resources include multiple control channel elements; and a sending module 1102, configured to send at least one E-PDCCH corresponding to at least one UE in at least one control channel element of the preset multiplexing unit, and send a DM RS corresponding to the at least one UE on the DM RS resources of the preset multiplexing unit, where the at least one resource block pair is a PRG, and the number of resource blocks RBs in the PRG is decided by system bandwidth.

In this embodiment, the sending module 1102 may include:

a first sending unit, configured to, when the at least one UE is multiple UEs, send E-PDCCHs corresponding to the multiple UEs in at least two control channel elements in the multiple control channel elements according to time-division multiplexing, or frequency-division multiplexing, or time-frequency multiplexing.

Alternatively, the sending module 1102 includes:

a second sending unit, configured to, for each UE in the at least one UE, send an DM RS of the UE on all DM RS time-frequency resources corresponding to a DM RS port allocated to the UE in the preset multiplexing unit; or, send, on the DM RS resources in the resource block pair carrying the E-PDCCH of the UE, the DM RS of the UE.

In this embodiment, furthermore, the configuration module is further configured to, when the at least one UE is multiple UEs, allocate different DM RS ports to the multiple UEs, or allocate the same DM RS port to at least two UEs in the multiple UEs.

When the configuration module allocates different DM RS ports to the multiple UEs, the sending module 1102 may include:

a third sending unit, configured to send the DM RSs of the multiple UEs according to frequency-division multiplexing, code-division multiplexing or frequency-division and code-division multiplexing.

In this embodiment, when the at least one UE is multiple UEs and DM RS ports are allocated to the multiple UEs, the sending module 1102 may further be configured to: notify the DM RS ports allocated to the multiple UEs to the multiple UEs through radio resource control RRC signaling; or, the configuration module is further configured to: configure a binding relationship between a DM RS port and an allocation pattern of the multiplexing unit in advance, where the binding relationship is also configured at a UE side.

In this embodiment, the configuration module 1101 may be configured to obtain the multiple control channel elements by dividing the E-PDCCH resources according to time-division multiplexing, or frequency-division multiplexing, or time-frequency multiplexing.

In this embodiment, the multiplexing unit may be formed by resources other than the PDCCH resources, CRS resources and CSI RS resources in at least one resource block pair.

In this embodiment, the number of control channel elements obtained by dividing from a multiplexing unit, and information such as a control channel element and DM RS port mapped by the UE may be notified to the UE by the base station through signaling, the signaling notification may be an RRC signaling semi-static notification; or, an allocation pattern of the control channel elements in the multiplexing unit may also be bound to a DM RS port, and the binding relationship is allocated and configured at the base station side and the UE side, so the base station does not need to notify the UE again separately.

The base station in this embodiment may be an eNB, which is not specifically limited in the embodiment of the present invention.

In the base station provided by the embodiment of the present invention, by dividing a multiplexing unit into multiple control channel elements, and sending at least one E-PDCCH of at least one UE, for each UE, the granularity of the enhanced downlink control channel is a control channel element. Compared with the granularity of an RB pair in the prior art, the granularity is reduced, resources are saved, and the downlink control channel is enhanced, thereby providing more control channels for the UE to use. The multiplexing unit may be divided into multiple control channel elements in time-division multiplexing, or frequency-division multiplexing, or time-frequency multiplexing, the multiple control channel elements may be distributed in a localized manner or in an alternate manner in various implementation manners, and the application is flexible and convenient.

Figure 12:
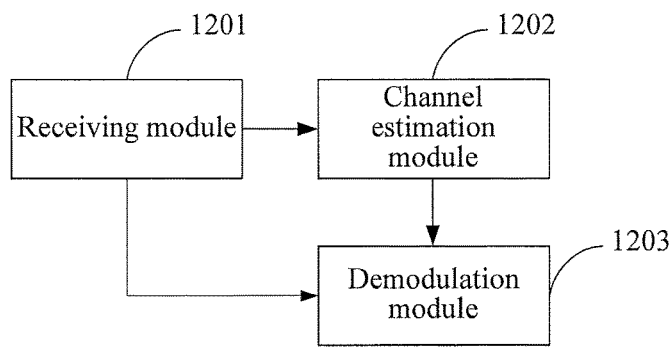
FIG. 12 is a structural diagram of a UE according to an embodiment of the present invention.

Referring to FIG. 12, another embodiment of the present invention provides a user equipment UE, including:

a receiving module 1201, configured to receive a signal on a multiplexing unit, where the multiplexing unit includes at least one resource block pair, the at least one resource block pair includes enhanced downlink control channel E-PDCCH resources and demodulation reference DM RS resources, and the E-PDCCH resources include multiple control channel elements;

a channel estimation module 1202, configured to perform channel estimation by using all DM RSs received on the multiplexing unit; and a demodulation module 1203, configured to demodulate the signal received on the E-PDCCH resources in the multiplexing unit by using a result of the channel estimation, so as to obtain an E-PDCCH, where the at least one resource block pair is a PRG, and the number of resource blocks RBs in the PRG is decided by system bandwidth.

The composition and division of the multiplexing unit involved in this embodiment are the same as the description in the foregoing method embodiments, which are not repeated again herein.

In this embodiment, the UE may obtain the number of control channel elements obtained by dividing from a multiplexing unit and information such as a control channel element and DM RS port mapped by the UE by receiving signaling, for example, RRC signaling, sent by a base station; or an allocation pattern of the control channel elements in the multiplexing unit may also be bound to the DM RS port in advance, and the binding relationship is allocated and configured at the base station side and the UE side, so the base station does not need to notify the UE again separately.

The UE provided by the embodiment of the present invention receives a signal in the multiplexing unit, uses all DM RS signals to perform channel estimation, and uses the result of channel estimation to demodulate the signal received on the E-PDCCH resources in the multiplexing unit, thereby obtaining the E-PDCCH of the UE. The granularity of the enhanced downlink control channel of the UE is the control channel element. Compared with the prior art, the granularity is reduced, resources are saved, and the downlink control channel is enhanced, thereby providing more control channels for the UE to use.

Figure 13:
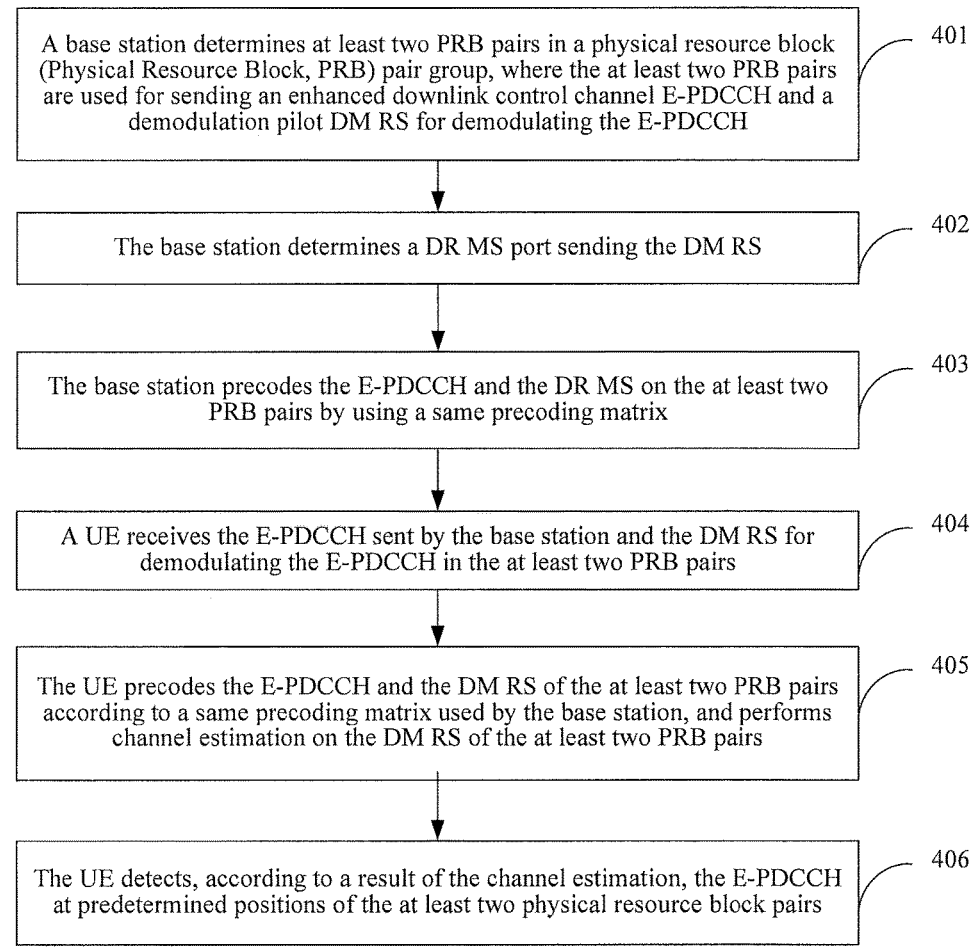
FIG. 13 is a flow chart of another method for sending an enhanced downlink control channel according to an embodiment of the present invention.

Referring to FIG. 13, FIG. 13 is a flow chart of another method for sending an enhanced downlink control channel according to an embodiment of the present invention. For technical terms in this embodiment, reference may be made to other embodiments of the present invention. The method for sending an enhanced downlink control channel provided by this embodiment includes the following steps.

401: A base station determines at least two PRB pairs in a physical resource block (Physical Resource Block, PRB) pair group, where the at least two PRB pairs used for sending an enhanced downlink control channel E-PDCCH and a demodulation reference DM RS for demodulating the E-PDCCH.

In an implementation manner of this embodiment, the PRB pair group is formed by multiple continuous PRB pairs; or the PRB pair group is a precoding resource block group PRG, and the number of PRBs in the PRG is decided by system bandwidth.

In an implementation manner of this embodiment, the E-PDCCH may be an E-PDCCH sent to a UE, or may be an E-PDCCH broadcasted to multiple UEs.

In an implementation manner of this embodiment, the at least two PRB pairs may be discontinuous PRB pairs or continuous PRB pairs in the PRB pair group. For example, the at least two PRB pairs may be RB pair n and RB pair (n+1) in FIG. 10*e* or FIG. 10*f*, and the E-PDCCH, for example, may be an E-PDCCH of UE 3 whose aggregation level is 4 and which is sent on eCCE2 to eCCE5.

402: The base station determines a DM RS port sending the DM RS.

Port numbers of the DM RS ports corresponding to the E-PDCCH in the RB pair n and the RB pair (n+1) may be the same or may be different. For example, as shown in FIG. 10*f*, the DM RS used for demodulating the E-PDCCH transmitted on eCCE2 to eCCE3 is sent on the DM RS port 9 or 10, and the DM RS used for demodulating the E-PDCCH transmitted on eCCE4 to eCCE5 is sent on the DM RS port 7 or 8. Reference may be made to the forgoing embodiments for other examples, and details are not repeated again herein.

In an implementation manner of this embodiment, when the E-PDCCH is transmitted on a single layer, determining the DM RS port sending the DM RS includes: in each PRB pair of the at least two PRB pairs, determining one DM RS port; when the E-PDCCH is transmitted on two layers, determining the DM RS port sending the DM RS includes: in each PRB pair of the at least two PRB pairs, determining a first DM RS port and a second DM RS port.

403: The base station precodes the E-PDCCH and the DM RS on the at least two PRB pairs by using the same precoding matrix.

Specifically, when an E-PDCCH is transmitted on at least two PRB pairs in a PRB pair group, if the E-PDCCH and the DM RS on the at least two PRB pairs are precoded by using the same precoding matrix, the UE may perform joint channel estimation on the DM RS of the at least two PRB pairs. The joint channel estimation may be: after the DM RS channel is obtained on the at least two PRB pairs and when the channel on the data RE is obtained according to the channel of the DM RS, not only the DM RS channel on the PRB pair where the RE is located is considered, but also the DM RS channels of other PRB pairs are considered. That is, by associating the DM RS channels on the at least two PRB pairs, the channel of each RE on each PRB pair is obtained.

In an implementation manner of this embodiment, when the E-PDCCH is transmitted on two layers, precoding the DM RS of the demodulation reference DM RS port on the at least two PRB pairs by using the same precoding matrix includes: precoding a DM RS of a first DM RS port on each PRB pair by using a precoding vector in the precoding matrix; and precoding a DM RS of a second DM RS port on each PRB pair by using another precoding vector of the same precoding matrix.

404: A UE receives the E-PDCCH sent by the base station and the DM RS for demodulating the E-PDCCH in the at least two PRB pairs.

Optionally, before 404, the step may further include: determining, by the UE, a DM RS port used for receiving the DM RS on each physical resource block pair in the at least two physical resource block pairs. At this time, 404 specifically is: receiving, by the UE, the DM RS on each physical resource block pair of the at least two physical resource block pairs by using the determined DM RS port. Port numbers of the DM RS ports used for receiving the DM RS may be different on the at least two physical resource block pairs.

Furthermore, when the E-PDCCH is in transmitted on a single layer, determining, by the UE, the DM RS port used for receiving the DM RS on each physical resource block pair in at least two physical resource block pairs includes: determining, by the UE, a DM RS port used for receiving the DM RS on each physical resource block pair in at least two physical resource block pairs. When the E-PDCCH is transmitted on two layers, determining, by the UE, the DM RS port used for receiving the DM RS on each physical resource block pair in at least two physical resource block pairs includes: determining, by the UE, a first DM RS port and a second DM RS port that are used for receiving the DM RS on each physical resource block pair in at least two physical resource block pairs.

405: The UE precodes the E-PDCCH and the DM RS of the at least two PRB pairs according to the same precoding matrix used by the base station, and performs channel estimation on the DM RS of the at least two PRB pairs.

Preferably, the UE may consider that the base station precodes the E-PDCCH and the DM RS on the at least two PRB pairs by using the same precoding matrix, that is, the UE considers that the condition of performing joint channel estimation is satisfied, and performs joint channel estimation on the DM RS of the at least two PRB pairs.

Furthermore, when the E-PDCCH is transmitted on two layers, precoding, by the UE, the E-PDCCH and the DM RS of the at least two physical resource block pairs according to the same precoding matrix used by the base station, and performing channel estimation on the DM RS of the at least two physical resource block pairs includes: precoding, by the UE, the DM RS of the first DM RS port of the at least two physical resource block pairs according to a precoding vector of the same precoding matrix used by the base station, and performing joint channel estimation on the DM RS received by the first DM RS port of the at least two physical resource block pairs, and precoding, by the UE, the DM RS of a second DM RS port of the at least two physical resource block pairs according to another precoding vector of the same precoding matrix used by the base station and performing joint channel estimation on the DM RS received by the second DM RS port on the at least two physical resource block pairs.

Precoding, by the UE, the DM RS of the first DM RS port of the at least two physical resource block pairs according to a precoding vector of the same precoding matrix used by the base station refers to that the UE considers that the condition of performing joint channel estimation on the DM RS received by the first DM RS port on the at least two physical resource block pairs is satisfied. Precoding, by the UE, the DM RS of the second DM RS port of the at least two physical resource block pairs according to another precoding vector of the same precoding matrix used by the base station refers to that the UE considers that the condition of performing joint channel estimation on the DM RS received by the second DM RS port on the at least two physical resource block pairs is satisfied.

406: The UE detects, according to a result of the channel estimation, the E-PDCCH at predetermined positions of the at least two physical resource block pairs.

A predetermined position is the position of the RE where the E-PDCCH is located, and the predetermined position is known to both the base station and the UE.

Figure 14:
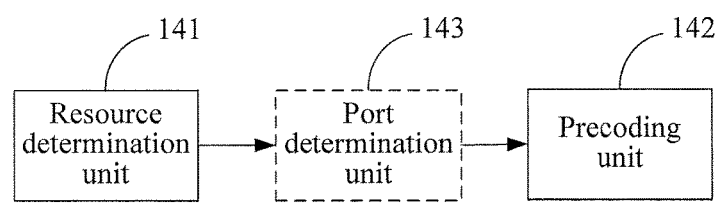
FIG. 14 is a structural diagram of a base station according to an embodiment of the present invention.

Referring to FIG. 14, FIG. 14 is a structural diagram of a base station according to an embodiment of the present invention. The base station of this embodiment may implement the method provided by the embodiment corresponding to FIG. 13. Related description in other embodiments is also applicable to the base station in this embodiment. The base station of this embodiment includes:

a resource determination unit 141, configured to determine at least two physical resource block pairs in a physical resource block pair group, where the at least two physical resource block pairs are used for sending an enhanced downlink control channel E-PDCCH and a demodulation reference DM RS for demodulating the E-PDCCH; and a precoding unit 142, configured to precode, by using the same precoding matrix, the E-PDCCH and the DM RS on the at least two physical resource block pairs determined by the resource determination unit 141.

In an implementation manner of this embodiment, the physical resource block pair group is formed by multiple continuous physical resource block pairs; or the physical resource block pair group is a precoding resource block group PRG, and the number of physical resource blocks in the PRG is decided by system bandwidth.

In another implementation manner of this embodiment, the base station further includes a port determination unit 143, configured to determine a DM RS port sending the DM RS, where port numbers of DM RS ports on the at least two physical resource block pairs are different.

In another implementation manner of this embodiment, when the E-PDCCH is transmitted on a single layer, the port determination unit 143 is configured to determine a DM RS port on each physical resource block pair of the at least two physical resource block pairs; when the E-PDCCH is transmitted on two layers, the port determination unit 143 is configured to determine a first DM RS port and a second DM RS port on each physical resource block pair of the at least two physical resource block pairs.

In another implementation manner of this embodiment, when the E-PDCCH is transmitted on two layers, the precoding unit 142 is configured to precode a DM RS of a first DM RS port on each physical resource block pair by using a precoding vector in a precoding matrix; and precode a DM RS of a second DM RS port on each physical resource block pair by using another precoding vector of the same precoding matrix.

In another implementation manner of this embodiment, the at least two physical resource block pairs are two continuous physical resource block pairs.

Figure 15:
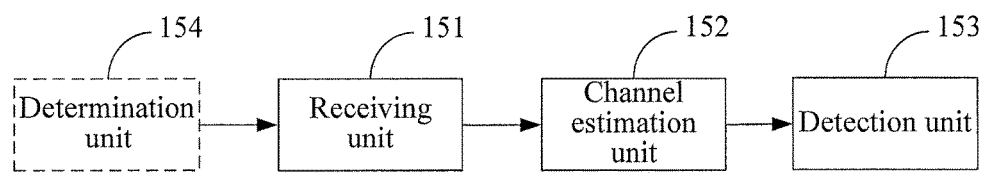
FIG. 15 is a structural diagram of a UE according to an embodiment of the present invention.

Referring to FIG. 15, FIG. 15 is a structural diagram of a user equipment UE according to an embodiment of the present invention. The UE of this embodiment may implement the method provided by the embodiment corresponding to FIG. 13. Related description in other embodiments is also applicable to the user equipment in this embodiment. The UE in this embodiment includes:

a receiving unit 151, configured to receive an enhanced downlink control channel E-PDCCH sent by a base station and a demodulation reference DM RS for demodulating the E-PDCCH on at least two physical resource block pairs in a physical resource block pair group;

a channel estimation unit 152, configured to precode the E-PDCCH and the DM RS of the at least two physical resource block pairs according to the same precoding matrix used by the base station, and perform channel estimation on the DM RS of the at least two physical resource block pairs received by the receiving unit 151; and a detection unit 153, configured to detect, according to a result of the channel estimation obtained by the channel estimation unit, the E-PDCCH at predetermined positions of the at least two physical resource block pairs.

In another implementation manner of this embodiment, the channel estimation unit 152 is configured to precode the E-PDCCH and the DM RS of the at least two physical resource block pairs according to the same precoding matrix used by the base station, and perform joint channel estimation on the DM RS of the at least two physical resource block pairs received by the receiving unit 151.

In another implementation manner of this embodiment, the physical resource block pair is formed by multiple continuous physical resource block pairs; or the physical resource block pair group is a precoding resource block group PRG, and the number of resource blocks RB in the PRG is decided by system bandwidth.

In another implementation manner of this embodiment, the UE further includes: a determination unit 154, configured to determine a DM RS port used for receiving a DM RS on each physical resource block pair in at least two physical resource block pairs; and the receiving unit 151 is configured to receive the DM RS on each physical resource block pair in the at least two physical resource block pairs by using the determined DM RS port, where port numbers of the DM RS ports used by receiving the DM RS in the at least two physical resource block pairs are different.

In another implementation manner of this embodiment, when the E-PDCCH is transmitted on a single layer, the determination unit 154 is configured to determine a DM RS port used for receiving the DM RS on each physical resource block pair of the at least two physical resource block pairs; and when the E-PDCCH is transmitted on two layers, the determination unit 154 is configured to determine a first DM RS port and a second DM RS port that are used for receiving the DM RS on each physical resource block pair of the at least two physical resource block pairs.

In another implementation manner of this embodiment, when the E-PDCCH is transmitted on two layers, the channel estimation unit 152 is configured to precode the DM RS of the first DM RS port of the at least two physical resource block pairs according to a precoding vector of the same precoding matrix used by the base station, perform joint channel estimation on the DM RS received by the first DM RS port of the at least two physical resource block pairs; precode the DM RS of the second DM RS port of the at least two physical resource block pairs according to another precoding vector of the same precoding matrix used by the base station, and perform joint channel estimation on the DM RS received by the second DM RS port of the at least two physical resource block pairs.

In another implementation manner of this embodiment, the at least two physical resource block pairs are two continuous physical resource block pairs.

Figure 16:
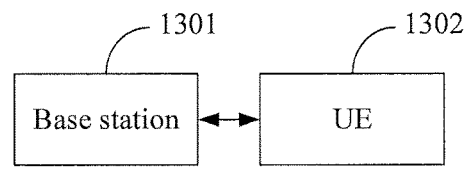
FIG. 16 is a structural diagram of a system for transmitting an enhanced downlink control channel according to an embodiment of the present invention.

Referring to FIG. 16, another embodiment of the present invention provides a system for transmitting downlink control information, including a base station 1301 and a UE 1302, where the base station 1301 may be a base station in any one of the foregoing embodiments, and the UE 1302 may be a UE in any one of the foregoing embodiments. In the system, by dividing a multiplexing unit into multiple control channel elements, and sending at least one E-PDCCH corresponding to at least one UE, for each UE, the granularity of an enhanced downlink control channel is a control channel element. Compared with the granularity of an RB pair in the prior art, the granularity is reduced, resources are saved, and the downlink control channel is enhanced, thereby providing more control channels for the UE to use. The multiplexing unit may be divided into multiple control channel elements in time-division multiplexing, or frequency-division multiplexing, or time-frequency multiplexing, the multiple control channel elements may be distributed in a localized manner or in an alternate manner in various implementation manners, and the application is flexible and convenient.

Persons of ordinary skill in the art may understand that all or a part of the steps of the forgoing embodiments may be implemented by hardware, or may be implemented by a program instructing relevant hardware. The program may be stored in a computer readable storage medium and the storage medium may be a read-only memory, a magnetic disk or an optical disk.

The above description is merely about exemplary embodiments of the present invention, but is not intended to limit the present invention. Any modifications, equivalent replacements or improvements made without departing from the spirit and principle of the present invention should fall within the protection scope of the present invention.

What is claimed is:

1. A method for sending an enhanced downlink control channel, comprising:

presetting a multiplexing unit, wherein the multiplexing unit comprises at least one resource block pair, the at least one resource block pair comprises enhanced downlink control channel E-PDCCH resources and demodulation reference DM RS resources, and the E-PDCCH resources comprise multiple control channel elements, and an allocation pattern of the control channel elements in the multiplexing unit is bound to a DM RS port;

configuring a binding relationship between the DM RS port and the allocation pattern of the multiple control channel elements of the multiplexing unit in advance, wherein the binding relationship is also configured at a UE side; and sending at least one E-PDCCH corresponding to at least one user equipment UE in at least one control channel element of the preset multiplexing unit, and sending a DM RS corresponding to the at least one UE on the DM RS resources of the preset multiplexing unit, wherein the at least one resource block pair is a precoding resource block group PRG, and the number of resource blocks RBs in the PRG is decided by system bandwidth.

2. The method according to claim 1, wherein the sending the at least one E-PDCCH corresponding to the at least one user equipment UE in the at least one control channel element of the preset multiplexing unit comprises:

when the at least one UE is multiple UEs, sending E-PDCCHs corresponding to the multiple UEs in at least two control channel elements in the multiple control channel elements according to time-division multiplexing, or frequency-division multiplexing, or time-frequency multiplexing.

3. The method according to claim 2, wherein the sending the DM RS corresponding to the at least one UE, comprises:
for each UE in the at least one UE, sending the DM RS of the UE on all DM RS time-frequency resources corresponding to the DM RS port allocated to the UE in the multiplexing unit; or,
sending, on the DM RS resources in the resource block pair carrying the E-PDCCH of the UE, the DM RS of the UE.

4. The method according to claim 1, wherein the sending the DM RS corresponding to the at least one UE, comprises:
for each UE in the at least one UE, sending the DM RS of the UE on all DM RS time-frequency resources corresponding to the DM RS port allocated to the UE in the preset multiplexing unit; or,
sending, on the DM RS resources in the resource block pair carrying the E-PDCCH of the UE, the DM RS of the UE.

5. The method according to claim 1, further comprising:
when the at least one UE is multiple UEs, allocating different DM RS ports to the multiple UEs, or allocating the same DM RS port to at least two UEs in the multiple UEs.

6. The method according to claim 5, wherein the sending, when different DM RS ports are allocated to the multiple UEs, the DM RS corresponding to the at least one UE, comprises:
sending the DM RSs of the multiple UEs according to frequency-division multiplexing, code-division multiplexing or frequency-division and code-division multiplexing.

7. The method according to claim 5, further comprising:
notifying the DM RS ports allocated to the multiple UEs to the multiple UEs through radio resource control RRC signaling.

8. The method according to claim 1, wherein
the multiple control channel elements are obtained after the E-PDCCH resources are divided according to time-division multiplexing, or frequency-division multiplexing, or time-frequency multiplexing.

9. The method according to claim 1, wherein
the multiplexing unit is formed by resources other than downlink control channel PDCCH resources, common reference signal CRS resources and channel-state information reference signal CSI RS resources in the at least one resource block pair.

10. A method for receiving an enhanced downlink control channel, comprising:
receiving a signal on a multiplexing unit, wherein the multiplexing unit comprises at least one resource block pair, the at least one resource block pair comprises enhanced downlink control channel E-PDCCH resources and demodulation reference DM RS resources, and the E-PDCCH resources comprise multiple control channel elements, and an allocation pattern of the control channel elements in the multiplexing unit is bound to a DM RS port;
configuring a binding relationship between the DM RS port and the allocation pattern of the control channel elements of the multiplexing unit in advance, wherein the binding relationship is also configured at a UE side;
performing channel estimation by using all DM RSs received on the multiplexing unit; and
demodulating the signal received on the E-PDCCH resources in the multiplexing unit by using a result of the channel estimation, so as to obtain an E-PDCCH;
wherein the at least one resource block pair is a precoding resource block group PRG, and the number of resource blocks RBs in the PRG is decided by system bandwidth.

11. A base station, comprising:
at least one memory to store instructions; and
at least one processor to execute the instructions to configure the base station to:
preset a multiplexing unit, wherein the multiplexing unit comprises at least one resource b lock pair, the at least one resource block pair comprises enhanced downlink control channel E-PDCCH resources and demodulation reference DM RS resources, and the E-PDCCH resources comprise multiple control channel elements, and an allocation pattern of the control channel elements in the multiplexing unit is bound to a DM RS port;
configure a binding relationship between the DM RS port and the allocation pattern of the control channel elements of the multiplexing unit in advance, wherein the binding relationship is also configured at a UE side; and
send at least one E-PDCCH corresponding to at least one user equipment UE in at least one control channel element of the preset multiplexing unit, and send a DM RS corresponding to the at least one UE on the DM RS resources of the preset multiplexing unit,
wherein the at least one resource block pair is a precoding resource block group PRG, and the number of resource blocks RBs in the PRG is decided by system bandwidth.

12. The base station according to claim 11, wherein the at least one processor to execute the instructions to further configure the base station to:
when the at least one UE is multiple UEs, send E-PDCCHs corresponding to the multiple UEs in at least two control channel elements in the multiple control channel elements according to time-division multiplexing, or frequency-division multiplexing, or time-frequency multiplexing.

13. The base station according to claim 11, wherein the at least one processor to execute the instructions to further configure the base station to:
for each UE in the at least one UE, send the DM RS of the UE on all DM RS time-frequency resources corresponding to the DM RS port allocated to the UE in the preset multiplexing unit; or, send, on the DM RS resources in the resource block pair carrying the E-PDCCH of the UE, the DM RS of the UE.

14. The base station according to claim 11, wherein the base station is further configured to: when the at least one UE is multiple UEs, allocate different DM RS ports to the multiple UEs, or allocate the same DM RS port to at least two UEs in the multiple UEs.

15. The base station according to claim 14, wherein the at least one processor to execute the instructions to further configure the base station to:
when the base station allocates different DM RS ports to the multiple UEs, the base station is further configured to send the DM RSs of the multiple UEs according to frequency-division multiplexing, code-division multiplexing or frequency-division and code-division multiplexing.

16. The base station according to claim 14, wherein base station is further configured to notify the DM RS ports allocated to the multiple UEs to the multiple UEs through radio resource control RRC signaling.

17. The base station according to claim 11, wherein base station is configured to obtain the multiple control channel elements by dividing the E-PDCCH resources according to time-division multiplexing, or frequency-division multiplexing, or time-frequency multiplexing.

18. A user equipment UE, comprising:
at least one memory to store instructions; and
at least one processor to execute the instructions to configure the UE to:
receive a signal in a multiplexing unit, wherein the multiplexing unit comprises at least one resource block pair, the at least one resource block pair comprises enhanced downlink control channel E-PDCCH resources and demodulation reference DM RS resources, and the E-PDCCH resources comprise multiple control channel elements, and an allocation pattern of the control channel elements in the multiplexing unit is bound to a DM RS port;
configure a binding relationship between the DM RS port and the allocation pattern of the control channel elements of the multiplexing unit in advance, wherein the binding relationship is also configured at a base station side; and
demodulate the signal received on the E-PDCCH resources in the multiplexing unit by using a result of the channel estimation, so as to obtain an E-PDCCH,
wherein the at least one resource block pair is a precoding resource block group PRG, and the number of resource blocks RBs in the PRG is decided by system bandwidth.

19. A method for sending an enhanced downlink control channel, comprising:
presetting a multiplexing unit, wherein the multiplexing unit comprises at least one resource block pair, the at least one resource block pair comprises enhanced downlink control channel E-PDCCH resources and demodulation reference DM RS resources, the E-PDCCH resources comprise multiple control channel elements, and an allocation pattern of the control channel elements in the multiplexing unit is bound to a DM RS port;
configure a binding relationship between the DM RS port and the allocation pattern of the multiple control channel elements of the multiplexing unit in advance, wherein the binding relationship is configured at a base station side and at a UE side; and
sending at least one E-PDCCH corresponding to at least one user equipment UE in at least one control channel element of the preset multiplexing unit, and sending a DM RS corresponding to the at least one UE on the DM RS resources of the preset multiplexing unit.

20. The method according to claim 19, wherein the sending the at least one E-PDCCH corresponding to the at least one user equipment UE in the at least one control channel element of the preset multiplexing unit comprises:
when the at least one UE is multiple UEs, sending E-PDCCHs corresponding to the multiple UEs in at least two control channel elements in the multiple control channel elements according to time-division multiplexing, or frequency-division multiplexing, or time-frequency multiplexing.

21. The method according to claim 19, wherein the sending the DM RS corresponding to the at least one UE comprises:
sending, on the DM RS resources in the resource block pair carrying the E-PDCCH of the UE, the DM RS of the UE.

22. The method according to claim 19, wherein
the multiplexing unit is formed by resources other than downlink control channel PDCCH resources, common reference signal CRS resources and channel-state information reference signal CSI RS resources in the at least one resource block pair.

23. A method for receiving an enhanced downlink control channel, comprising:
receiving a signal on a multiplexing unit, wherein the multiplexing unit comprises at least one resource block pair, the at least one resource block pair comprises enhanced downlink control channel E-PDCCH resources and demodulation reference DM RS resources, the E-PDCCH resources comprise multiple control channel elements, and an allocation pattern of the control channel elements in the multiplexing unit is bound to a DM RS port;
configure a binding relationship between the DM RS port and the allocation pattern of the multiple control channel elements of the multiplexing unit in advance, wherein the binding relationship is configured at a base station side and at a UE side;
performing channel estimation by using all DM RSs received on the multiplexing unit; and
demodulating the signal received on the E-PDCCH resources in the multiplexing unit by using a result of the channel estimation, so as to obtain an E-PDCCH.

24. A base station, comprising:
at least one memory to store instructions; and
at least one processor to execute the instructions to configure the base station to:
preset a multiplexing unit, wherein the multiplexing unit comprises at least one resource block pair, the at least one resource block pair comprises enhanced downlink control channel E-PDCCH resources and demodulation reference DM RS resources, the E-PDCCH resources comprise multiple control channel elements, and an allocation pattern of the control channel elements in the multiplexing unit is bound to a DM RS port;
configure a binding relationship between the DM RS port and the allocation pattern of the multiple control channel elements of the multiplexing unit in advance, wherein the binding relationship is also configured at a UE side; and
send at least one E-PDCCH corresponding to at least one user equipment UE in at least one control channel element of the preset multiplexing unit, and send a DM RS corresponding to the at least one UE on the DM RS resources of the preset multiplexing unit.

25. The base station according to claim 24, wherein the base station is further configured to, when the at least one UE is multiple UEs, send E-PDCCHs corresponding to the multiple UEs in at least two control channel elements in the multiple control channel elements according to time-division multiplexing, or frequency-division multiplexing, or time-frequency multiplexing.

26. The base station according to claim 24, wherein the base station is further configured to send, on the DM RS resources in the resource block pair carrying the E-PDCCH of the UE, the DM RS of the UE.

27. A user equipment UE, comprising:
at least one memory to store instructions; and
at least one processor to execute the instructions to configure the UE to:
receive a signal on a multiplexing unit, wherein the multiplexing unit comprises at least one resource block pair, the at least one resource block pair comprises enhanced downlink control channel E-PDCCH resources and demodulation reference DM RS resources, the E-PDCCH resources comprise multiple control channel elements, and an allocation pattern of the control channel elements in the multiplexing unit is bound to a DM RS port;
configure a binding relationship between the DM RS port and the allocation pattern of the multiple control channel elements of the multiplexing unit in advance, wherein the binding relationship is also configured at a base station side;
perform channel estimation by using all DM RSs received on the multiplexing unit; and
demodulate the signal received on the E-PDCCH resources in the multiplexing unit by using a result of the channel estimation, so as to obtain an E-PDCCH.

28. A non-transitory computer-readable medium storing processor-executable instructions, the processor-executable instructions, when executed by a processor, facilitating performance of a data transmission method, the data transmission method comprising:
receiving a signal on a multiplexing unit, wherein the multiplexing unit comprises at least one resource block pair, the at least one resource block pair comprises enhanced downlink control channel E-PDCCH resources and demodulation reference DM RS resources, the E-PDCCH resources comprise multiple control channel elements, and an allocation pattern of the control channel elements in the multiplexing unit is bound to a DM RS port;
configuring a binding relationship between the DM RS port and the allocation pattern of the multiple control channel elements of the multiplexing unit in advance, wherein the binding relationship is configured at a base station side and at a UE side;
performing channel estimation by using all DM RSs received on the multiplexing unit; and
demodulating the signal received on the E-PDCCH resources in the multiplexing unit by using a result of the channel estimation, so as to obtain an E-PDCCH.

* * * * *

UNITED STATES PATENT AND TRADEMARK OFFICE
CERTIFICATE OF CORRECTION

PATENT NO. : 10,277,372 B2
APPLICATION NO. : 14/182558
DATED : April 30, 2019
INVENTOR(S) : Qiang Wu et al.

Page 1 of 1

It is certified that error appears in the above-identified patent and that said Letters Patent is hereby corrected as shown below:

In the Claims

Column 24, Line 15:
In Claim 11, delete "b lock" and insert -- block --, therefor.

Signed and Sealed this
Twenty-sixth Day of November, 2019

Andrei Iancu
*Director of the United States Patent and Trademark Office*